(12) United States Patent
Kim et al.

(10) Patent No.: US 7,376,210 B2
(45) Date of Patent: May 20, 2008

(54) APPARATUS AND METHOD FOR PERFORMING ADAPTIVE CHANNEL ESTIMATION IN A MOBILE COMMUNICATION SYSTEM

(75) Inventors: Hun-Kee Kim, Seoul (KR); Gin-Kyu Chol, Chongro-gu (KR); Yong-Suk Moon, Kyonggi-do (KR); Noh-Sun Kim, Swon-shi (KR)

(73) Assignee: Samsung Electronics Co., Ltd., Suwon, Si (KR)

( * ) Notice: Subject to any disclaimer, the term of this patent is extended or adjusted under 35 U.S.C. 154(b) by 759 days.

(21) Appl. No.: 10/614,078

(22) Filed: Jul. 8, 2003

(65) Prior Publication Data

US 2004/0076185 A1 Apr. 22, 2004

(30) Foreign Application Priority Data

Jul. 9, 2002 (KR) ........................ 10-2002-0039847

(51) Int. Cl.
*H04B 1/10* (2006.01)

(52) U.S. Cl. ........................ 375/350; 342/99; 348/683; 358/463; 367/94; 455/114.2; 455/278.1; 455/296

(58) Field of Classification Search ................ 324/132; 375/147, 262, 368; 381/94.2, 17; 382/26; 342/84; 600/454; 708/320
See application file for complete search history.

(56) References Cited

U.S. PATENT DOCUMENTS

| | | | | |
|---|---|---|---|---|
| 4,450,445 A | * | 5/1984 | Conner et al. ................ 342/84 |
| 5,943,427 A | * | 8/1999 | Massie et al. ................ 381/17 |
| 6,049,577 A | * | 4/2000 | Gothe et al. ................ 375/368 |
| 6,055,318 A | * | 4/2000 | Whitecar .................... 381/94.2 |
| 6,263,354 B1 | * | 7/2001 | Gandhi ....................... 708/320 |
| 6,907,143 B2 | * | 6/2005 | Ferguson .................... 382/261 |
| 2002/0009128 A1 | * | 1/2002 | Ito ............................. 375/147 |

OTHER PUBLICATIONS

Liu et al; Modified Autocorrelation Method Compared With Maximum Entropy Method and RF Cross Correlation as Mean Frequency Estimator for Doppler Ultrasound; 1991 Ultrasonics Forum; pp. 1285-1290.*

* cited by examiner

*Primary Examiner*—David C. Payne
*Assistant Examiner*—Adolf DSouza
(74) *Attorney, Agent, or Firm*—Roylance, Abrams, Berdo & Goodman, LLP

(57) ABSTRACT

Disclosed is an adaptive channel estimator for improving a performance of a general channel estimator in a mobile communication system, and a method for controlling the same. The adaptive channel estimator further detects a noise level of a channel and a channel speed, and implements an optimum noise elimination filter on the basis of the detected noise level and channel speed. A comparison between mapping degrees predetermined by the detected noise level and channel speed allows an optimum noise elimination filter to be implemented, If such a channel estimator is implemented, then optimum packet data transmission is available for not only a low-speed channel but also a high-speed channel. A channel compensation caused by a difference between a spreading factor (SF) of a pilot channel and a spreading factor (SF) of a data channel can be compensated on the condition that a slope compensator executed by a SF ratio is controlled by a filter coefficient controller.

35 Claims, 13 Drawing Sheets

APPARATUS AND METHOD FOR PERFORMING ADAPTIVE CHANNEL ESTIMATION IN A MOBILE COMMUNICATION SYSTEM

PRIORITY

This application claims priority to an application entitled "APPARATUS AND METHOD FOR PERFORMING ADAPTIVE CHANNEL ESTIMATION IN MOBILE COMMUNICATION SYSTEM", filed in the Korean Industrial Property Office on Jul. 9, 2002 and assigned Ser. No. 2002-39847, the contents of which are incorporated herein by reference.

CROSS REFERENCE TO RELATED APPLICATION

Related subject matter is disclosed in U.S. Non-Provisional application of Hun-Kee Kim et al., filed on _____, entitled "Adaptive Transmit Antenna Diversity Apparatus And Method In A Mobile Communication System", the contents of which are incorporated herein by reference.

BACKGROUND OF THE INVENTION

1. Field of the Invention

The present invention relates to an apparatus and method for performing channel estimation in a mobile communication system, and more particularly to an apparatus and method for performing adaptive channel estimation according to wireless channel environments in a mobile communication system.

2. Description of the Related Art

Mobile communication systems have evolved from providing a user with voice signals to providing the user with high-speed and high-quality wireless data packets, allowing users to use a variety of data services and multimedia services. A third-generation mobile communication system classified as a 3GPP (3rd Generation Partnership Project) is an asynchronous system, and a 3GPP2 is a synchronous system. Both $3^{rd}$ generation systems are being standardized to implement high-speed and high-quality wireless packet communication services. For example, a HSDPA (High Speed Downlink Packet Access) standardization is in progress for the 3GPP, and a 1×EV-DV standardization is in progress for the 3GPP2. Standardization is needed for users or subscribers to receive high-speed (more than 2 Mbps) and high-quality wireless data packet transmission service in the third-generation mobile communication system. A fourth-generation mobile communication system is needed for users or subscribers to receive higher-speed and higher-quality multimedia communication services.

Typically, the HSDPA scheme is a specific data transfer scheme for processing a HS-DSCH (High Speed-Downlink Shared Channel) and its associated control channels. The HS-DSCH is a downlink data channel for supporting a downlink high-speed packet data transmission service in an asynchronous UMTS (Universal Mobile Terrestrial System) mobile communication system.

The HSDPA scheme requires general techniques used for a conventional mobile communication system, and other advanced techniques for improving channel environment adaptability. Recently, three schemes have been developed for supporting a high-speed packet transmission service in the HSDPA, i.e., an AMCS (Adaptive Modulation and Coding Scheme), a n-channel SAW (Stop And Wait) HARQ (Hybrid Automatic Repeat Request) scheme, and a FCS (Fast Cell Selection) scheme.

Firstly, the AMCS determines modulation and coding methods of a data channel according to a channel status between a cell and a user. This results in increased channel usage efficiency of overall cells. A combined scheme between the modulation method and the coding method is called a MCS (Modulation and Coding Scheme), and can be defined as a plurality of MCSs ranging from a level "1" to a level "n". The AMCS adaptively determines individual levels of the MCSs according to a channel status between a user and a cell. This results in increased overall channel usage efficiency.

Secondly, the n-channel SAW HARQ scheme functioning as one of many HARQ schemes successively transmits a plurality of packets even though an ACK (ACKnowledgement) signal is not received, resulting in increased channel usage efficiency. In other words, provided that N logic channels are set up between a UE (User Equipment) and a Node-B, and these N logic channels can be identified by a specific time or a specific channel number, the UE serving as a reception end can recognize which one of the channels contains a packet received at a predetermined time. Further, the UE can reconstruct packets in the order of reception.

Thirdly, the FCS scheme receives packets from a cell which maintains the best channel status when the UE using the HSDPA enters a soft handover region. This results in reduced overall interference between channels. If the cell for providing a user with the best channel status is changed to a new cell, the FCS scheme performs packet transmission using a HS-DSCH of this new cell. When performing such packet transmission, there is a need for the FCS scheme to minimize transmission discontinuity time.

The AMCS contained in the aforementioned three high-speed packet transmission services will hereinafter be described in more detail.

There are a variety of modulation/demodulation schemes being currently investigated for the AMCS, for example, a QPSK (Quadrature Phase Shift Keying), a 8PSK, and a 16QAM (16 Quadrature Amplitude Modulation), etc. A variety of code rates ranging from "¼" to "1" are being considered by many developers as a coding scheme. Therefore, a mobile communication system using the AMCS provides high-order modulation/demodulation schemes (e.g., 8PSK, and 16QAM) and a high code rate to UEs (e.g., UEs located in the vicinity of a Node-B) assigned to a good channel, whereas it provides a low-order modulation scheme such as a QPSK and a low code rate to UEs (e.g., UEs located at a cell boundary) assigned to a relatively poor channel. Rather than use the QPSK, it is possible for the QPSK serving as a low-order modulation scheme to perform channel estimation using a phase prediction function, because the QPSK contains one symbol for every quadrant with respect to the constellation. However, two or four symbols for every quadrant are provided for the 8PSK and 16QAM serving as a high-order modulation scheme. Specifically, several symbols having different amplitudes are positioned in the same phase region, such that not only phase estimation but also channel estimation based on precise amplitude information is needed.

In the meantime, the utilization of the high-order modulation scheme for performing high-speed and high-quality data services and the high code rate is mainly restricted due to a variety of wireless channel environments, for example, a white noise, a variation in signal reception power levels due to the fading phenomenon, a shadowing occurrence, a Doppler effect caused by UE's mobility and UE's frequent speed change, and a signal interference caused by either another user or multipath signals, etc. Therefore, a mobile communication system requires appropriate modulation/coding schemes according to wireless channel environments which vary according to the above mentioned factors. A receiver of the mobile communication system should have a channel estimator functioning as an additional signal compensator for changing reception signals undesirably distorted by the above mentioned factors to original signals.

Typically, a conventional mobile communication system adapts pilot signals to predict such wireless channel environments. Specifically, a Node-B transmits pilot signals over a common pilot channel such as a PICH or CPICH. All UEs contained in a given area of the Node-B receive the pilot signals from the Node-B, and predict the wireless channel environments such as the fading phenomenon using the received pilot signals. However, it is difficult for the above method to predict a wireless channel environment change caused by random white noise characteristics. To solve this problem, the channel estimator includes a noise elimination filter for smoothing random characteristics of the white noise, such that the noise can be considerably reduced. For example, IIR (Infinite Impulse Response) filter is mainly adapted as the noise elimination filter, and is suitable for a mobile communication system adapting a QPSK as a modulation scheme.

FIG. 1 is a block diagram of an example of a channel estimator for use in a conventional mobile communication system. FIG. 2 is a block diagram illustrating an example of a channel estimator for use in a receiver of a conventional mobile communication system. The channel estimator shown in FIG. 1 includes a first integration/dump filter 110, a second integration/dump filter 130, a complex conjugate pattern generator 120, and a noise elimination filter 140.

Referring to FIG. 1, input signals IN are provided to the first integration/dump filter 110. The input signals may be pilot signals received from common pilot channels, for example. The first integration/dump filter 110 accumulates the input signals (i.e., the pilot signals) in response to a SF (Spreading Factor) used for the common pilot channels, and numerically integrates the accumulated input signals. A measurement detected by the first integration/dump filter 110 may be reception intensity in symbol units in association with the input signals. This measurement is provided to a multiplier 150.

The complex conjugate pattern generator 120 generates a complex conjugate pattern corresponding to a symbol pattern of a pilot signal transmitted over the common pilot channel. The complex conjugate pattern generated from the complex conjugate pattern generator 120 is applied to the multiplier 150. The multiplier 150 multiplies the complex conjugate pattern generated from the complex conjugate pattern generator 120 by the measurement generated from the first integration/dump filter 110, and thus generates a subdivided signal corresponding to a desired antenna. The subdivided signal associated with the desired antenna is received from the multiplier 150, and is transmitted to the second integration/dump filter 130. The second integration/dump filter 130 receives subdivided signals for desired antennas from the multiplier 150, accumulates the subdivided signals in two-symbol units, numerically integrates the accumulated signals, and thus outputs a channel prediction value. But, this channel prediction value does not consider the white noise contained in the input signals IN. Therefore, the channel prediction value is transmitted to the noise elimination filter 140 to obtain a more accurate value which considers the white noise. The noise elimination filter 140 then removes the white noise component contained in the channel prediction value from an output signal of the second integration/dump filter 130, and thus generates a correct channel prediction value. The IIR filter may be adapted as the noise elimination filter 140.

A detailed circuit diagram of the IIR filter functioning as the noise elimination filter 130 is shown in FIGS. 2 and 3. FIG. 3 is a detailed block diagram of an example of an N-th IIR filter adapted as another example of the noise elimination filter of FIG. 1. Specifically, FIG. 2 is a detailed circuit diagram of a primary IIR filter, and FIG. 3 is a detailed circuit diagram of an N-th IIR filter.

I/O (Input/Output) characteristic of the primary IIR filter is represented by the following Equation 1:

$$y(n) = b \cdot x(n) + a \cdot y(n-1) \qquad \text{[Equation]}$$

where y(n) is a current output signal, x(n) is a current input signal, and y(n−1) is a previous output signal.

With reference to the above Equation 1, the output signal "y(n)" is the sum of the input signal "x(n)" multiplied by a constant "b" and one-delayed output signal "y(n−1)" multiplied by the other constant "a".

The I/O characteristic of the N-th IIR filter is represented by the following Equation 2:

$$y(n) = b \bullet x(n) + \sum_{k=1}^{N} a_k \bullet y(n-k) \qquad \text{[Equation 2]}$$

As can be seen from the above Equation 2, the I/O characteristic of the N-th IIR filter considers first to N-th previous output signals y(n−1), y(n−2), . . . , y(n−N). As shown in the above Equation 2, the output signal "y(n)" is the sum of the input signal "x(n)" multiplied by a constant "b" and individual delayed output signals (i.e., first to N-th delayed output signals) multiplied by the other constant "a".

As can be seen from the above Equations 1 and 2, the characteristic of the IIR filter is determined by filter coefficients "a" and "b". The filter coefficient "a" is a feedback weight, and the other coefficient "b" is an input weight.

Referring to FIG. 2, an input signal x(n) is provided to a first multiplier 210. The signal is multiplied by the first filter coefficient "b", and is then transmitted to one input terminal of an adder 212. The other input terminal of the adder 212 receives a signal a·y(n−1) derived by multiplication of a previous output signal y(n−1) and a second filter coefficient "a". The adder 212 adds an output signal b·x(n) of the first multiplier 210 and the output signal a·y(n−1) of a second multiplier 216 to create a result signal b·x(n)+a·y(n−1), resulting in a channel prediction value y(n) equal to the result signal b·x(n)+a·y(n−1). The channel prediction value y(n) is transmitted to a delay 214. The delay 214 delays the received signal y(n) to provide a delayed signal y(n−1), and transmits the delayed signal y(n−1) to the second multiplier 216.

The IIR filter applies a previous output signal to a new input signal, and thus prevents its output signal from being abruptly changed due to a white noise.

The frequency characteristic of the primary IIR filter shown in FIG. 2 is represented by the following Equation 3:

$$H(e^{jw}) = \frac{b}{1 - a \bullet e^{-jw}} \quad \text{[Equation 3]}$$

A direct current (DC) gain of the primary IIR filter having the above frequency characteristic shown in the above Equation 3 is a specific value at a prescribed condition of ω=0 indicating a frequency of "0", such that the DC gain can be represented by the following Equation 4:

$$|H(1)| = \frac{|b|}{|1-a|} \quad \text{[Equation 4]}$$

Therefore, with reference to the above Equation 4, the DC gain at a predetermined condition of |b|=|1−a| is normalized to "1".

Referring to FIG. 3, an input signal x(n) is applied to a first multiplier 310. The input signal is multiplied by the first filter coefficient "b", and is then applied to an adder 312. The other input terminal of the adder 312 receives signals $a_1 \cdot y(n-1)$ to $a_N \cdot y(n-N)$ from N second multipliers 316-1 to 316-N. The received signals $a_1 \cdot y(n-1)$ to $a_N \cdot y(n-N)$ are created by a multiplication previous output signals y(n−1) to y(n−N) and second filter coefficients $a_1$ to $a_N$. The adder 312 adds an output signal b·x(n) of the first multiplier 310 and the output signals $a_1 \cdot y(n-1)$ to $a_N \cdot y(n-N)$ of the second multipliers 316 to create a result signal $b \cdot x(n) + a_1 \cdot y(n-1) + \ldots + a_N \cdot y(n-N)$, resulting in a channel prediction value y(n) equal to the result signal $b \cdot x(n) + a_1 \cdot y(n-1) + \ldots + a_N \cdot y(n-N)$. The channel prediction value y(n) is transmitted to a plurality of delays 314-1 to 314-N to create delayed signals y(n−1), y(n−2), . . . , y(n−N). In this case, the delays 314-1 to 314-N have different delay values.

As stated above, the N-th IIR filter shown in FIG. 3 uses N feedback signals composed of first to N-th feedback signals, resulting in more precisely correcting a noise component contained in a desired signal.

The frequency characteristic of the N-th IIR filter shown in FIG. 3 is represented by the following Equation 5:

$$H(e^{jw}) = \frac{Y(e^{jw})}{X(e^{jw})} = \frac{b}{1 - \sum_{k=1}^{N} a_k \bullet e^{-jw}} \quad \text{[Equation 5]}$$

A DC gain of the N-th IIR filter having the above frequency characteristic shown in the above Equation 5 is represented by the following Equation 6:

$$|H(1)| = \frac{|b|}{\left|1 - \sum_{k=1}^{N} a_k\right|} \quad \text{[Equation 6]}$$

Therefore, with reference to the above Equation 6, the DC gain at a predetermined condition of $$|b| = \left|1 - \sum_{k=1}^{N} a_k\right|$$

is normalized to "1".

The channel estimator can be implemented with a plurality of channel estimators according to whether or not a Tx-diversity (i.e., a transmission diversity) is used. If the Tx-diversity is not used, the channel estimator can be implemented with only one channel estimator. Otherwise, if the Tx-diversity is used, a plurality of channel estimators equivalent to the number of antennas used are needed. However, the channel estimator has the same configuration as FIG. 1, irrespective of the use of Tx-diversity. Referring to FIG. 1, a complex conjugate pattern generated from the complex conjugate pattern generator 120 contained in the channel estimator may be one or more patterns according to the use of Tx-diversity. If Tx-diversity is provided, only one antenna is used, such that only one symbol pattern is generated. If Tx-diversity is adapted using a plurality of antennas, a plurality of symbol patterns are adapted to discriminate among the plurality of antennas. The symbol patterns are adapted to discriminate among the antennas so as to separate each pilot signal from orthogonal pilot signals for every antenna, allowing individual symbol patterns associated with individual antennas to be orthogonal to each other.

In another example, individual channel estimators should be configured to be associated with individual antennas, one channel estimator selected from among many channel estimators should always be operated, irrespective of the use of Tx-diversity. The remaining channel estimators other than the selected one channel estimator should be operated only when they use the Tx-diversity.

Although a channel estimator having the IIR filter is suitably used for a QPSK being a low-order modulation scheme, several problems may occur if a high-order modulation scheme is applied to the channel estimator. For example, a 16QAM being a high-order modulation scheme is very sensitive to a noise problem as compared to QPSK, such that the 16QAM is mainly used at a relatively high SNR (Signal to Noise Ratio). In conclusion, there is less necessity for the IIR filter in the 16QAM compared with the QPSK. In more detail, a noise elimination filter may deteriorate performance of the channel estimator in a wireless channel environment where there is a white noise lower than that of the QPSK. This problem of the noise elimination filter is called a lagging phenomenon, and is caused by characteristics of the IIR filter.

The following Table 1 shows examples of preferable coefficient values "a" and "b" which are adapted to the IIR filter according to the Doppler frequency and a moving speed of a mobile terminal (i.e., a UE). As shown in the Table 1, it is assumed that a chip rate is 3.84 Mcps, and a sample frequency $f_s$ for updating channel estimation in units of 516 chips is 3.84 Mcps/512 chip, i.e., 7500 Hz.

TABLE 1

| A | b = 1 − a | Cutoff frequency (3 dB) | Transfer speed |
| --- | --- | --- | --- |
| 1/4 | 3/4 | 2024 Hz | 1093 km/h |
| 1/2 | 1/2 | 862 Hz | 465 km/h |
| 3/4 | 1/4 | 346 Hz | 197 km/h |
| 7/8 | 1/8 | 159 Hz | 86 km/h |

Typically, a mobile communication system determines a moving speed of a mobile terminal, and sets the filter coefficients "a" and "b" associated with the determined moving speed to fixed values, respectively. Specifically, the filter coefficients "a" and "b" for use in the IIR filter are respectively fixed to only one value corresponding to a specific moving speed of the mobile terminal, such that the IIR filter can be operated by the fixed values "a" and "b" even though a wireless channel environment is changed to another wireless channel environment, resulting in unexpected problems.

Such unexpected problems will hereinafter be described in more detail with reference to FIGS. 4a and 4b. A feedback signal (i.e., a previous output signal) of the IIR filter shown in FIGS. 2 and 3 incurs the lagging phenomenon, because a current output signal of the IIR filter is based on a previous output signal. The lagging phenomenon is more critical to a wireless channel environment changing at a high speed, and is more clearly shown in FIGS. 4a and 4b. FIG. 4a is a graph illustrating an example of a lagging phenomenon of the IIR filter in a conventional high-speed fading channel. FIG. 4b is a graph illustrating an example of a lagging phenomenon of the IIR filter in a conventional low-speed fading channel. As can be seen from FIGS. 4a and 4b, the lagging phenomenon of FIG. 4a has a signal level higher than that of FIG. 4b. Therefore, provided that a wireless channel environment is abruptly changed, there are large differences in predicted values of a channel estimator even though the same delay time is provided, such that it is impossible for a reception signal to further reduce its own BER (Bit Error Rate).

To overcome the aforementioned disadvantages, the low-order modulation scheme is generally operated at a region of a low SNR lower than that of the high-order modulation scheme, and is more sensitive to a signal distortion than a signal amplitude, such that it is not affected by the lagging phenomenon. However, if a high-order modulation scheme is used in a same way as in a HSDPA mobile communication system, the lagging phenomenon deteriorates the overall system performance. Therefore, a new method for solving the above problems is needed.

SUMMARY OF THE INVENTION

Therefore, it is an object of embodiments of the present invention to provide an apparatus and method for removing a noise from a desired signal by predicting information about a wireless channel environment.

It is another object of embodiments of the present invention to provide an apparatus and method for adapting a high-order modulation scheme, and thereby preventing a system performance from being deteriorated due to a lagging phenomenon of a mobile communication system.

It is yet another object of embodiments of the present invention to provide a noise elimination filter for adaptively coping with a low-order modulation scheme and a high-order modulation scheme.

It is yet further another object of embodiments of the present invention to provide an apparatus and method for compensating for a difference between a SF (Spreading Factor) of a pilot channel and a SF of a data channel.

In accordance with an embodiment of the present invention, the above and other objects can be accomplished by the provision of a method for determining first and second filter coefficients in a noise elimination filter which receives a predicted channel response signal and the first and second filter coefficients where their sum is set to a predetermined value, and removes a noise component from the predicted channel response signal, comprising the steps of: a) detecting a noise level upon receiving a difference between the predicted channel response signal and a previously predicted channel response signal, and detecting channel speed prediction information upon receiving an auto-correlation function of the predicted channel response signal; and b) determining first and second filter coefficients mapping-processed by the detected noise level and the detected channel speed prediction information.

In accordance with another embodiment of the present invention, there is provided an apparatus for determining first and second filter coefficients in a noise elimination filter which receives a predicted channel response signal and the first and second filter coefficients where their sum is set to a predetermined value, and removes a noise component from the predicted channel response signal, comprising: a channel-speed/noise-level detector for detecting a noise level upon receiving a difference between the predicted channel response signal and a previously predicted channel response signal, and detecting channel speed prediction information upon receiving an auto-correlation function of the predicted channel response signal; and a filter coefficient controller for determining first and second filter coefficients mapping-processed by the detected noise level and the detected channel speed prediction information.

In accordance with yet another embodiment of the present invention, there is provided a method for receiving a common pilot channel signal at an adaptive channel estimator of a mobile communication system, and removing a noise from the received common pilot channel signal, comprising the steps of: a) multiplying a complex conjugate of a corresponding pilot symbol by the common pilot channel signal, and outputting a predicted fading channel response signal; b) detecting a noise level contained in the predicted fading channel response signal; c) detecting a channel speed of the common pilot channel signal on the basis of the predicted fading channel response; d) comparing the detected noise level with at least one first reference value; e) comparing the detected channel speed with at least one second reference value; f) determining first and second filter coefficients mapped with an area corresponding to the comparing result to be filter coefficients for noise elimination, the first and second filter coefficients being mapping-processed for every area assigned by the first and second reference values; and g) removing a noise component from the predicted fading channel response signal using the determined first filter coefficient and the determined second coefficient.

In accordance with yet further another embodiment of the present invention, there is provided an apparatus for receiving a common pilot channel signal at an adaptive channel estimator of a mobile communication system, and removing a noise from the received common pilot channel signal, comprising: a multiplier and an integration/dump filter for multiplying a complex conjugate of a corresponding pilot symbol by the common pilot channel signal, and outputting a predicted fading channel response signal; a channel-speed/noise-level detector for detecting a noise level contained in the predicted fading channel response signal, and detecting a channel speed of the common pilot channel signal; a filter coefficient controller for setting first and second filter coefficients mapped with an area corresponding to the comparing result to noise elimination filter coefficients, the first and second filter coefficients being mapping-processed for every area assigned by the first and second reference values; and a noise elimination filter for removing a noise component from the predicted fading channel response signal using the determined first filter coefficient and the determined second coefficient.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF THE PREFERRED EMBODIMENTS

Figure 1:
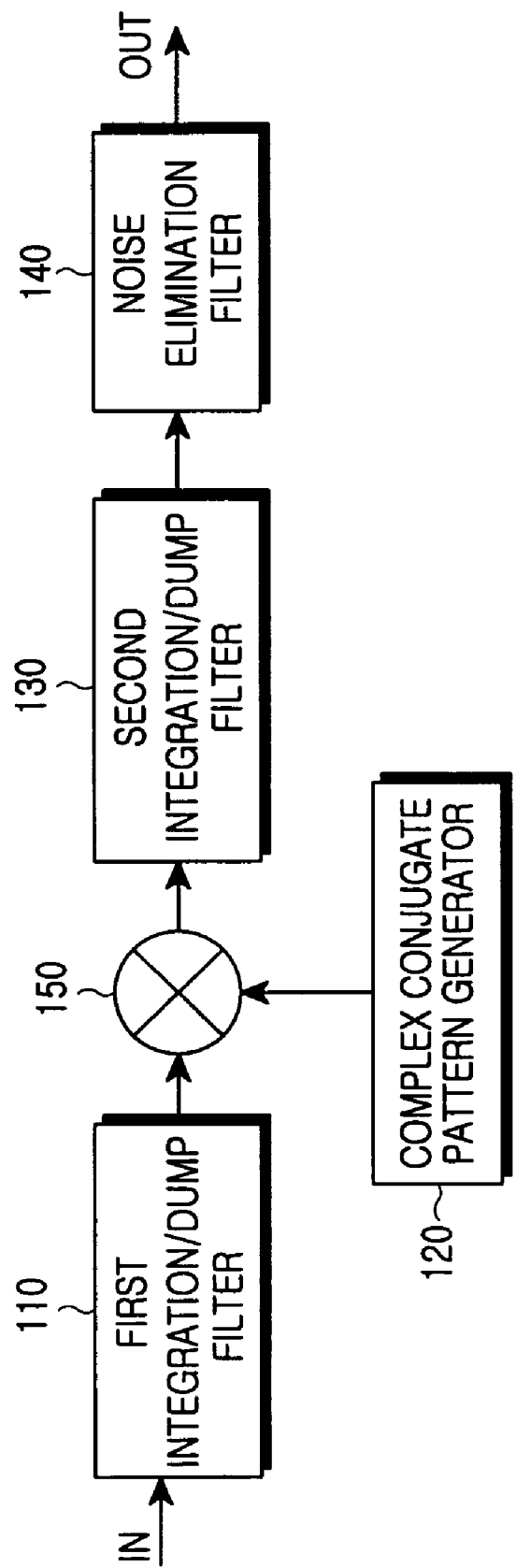
FIG. 1 is a block diagram of an example of a channel estimator for use in a conventional mobile communication system.
Figure 2:
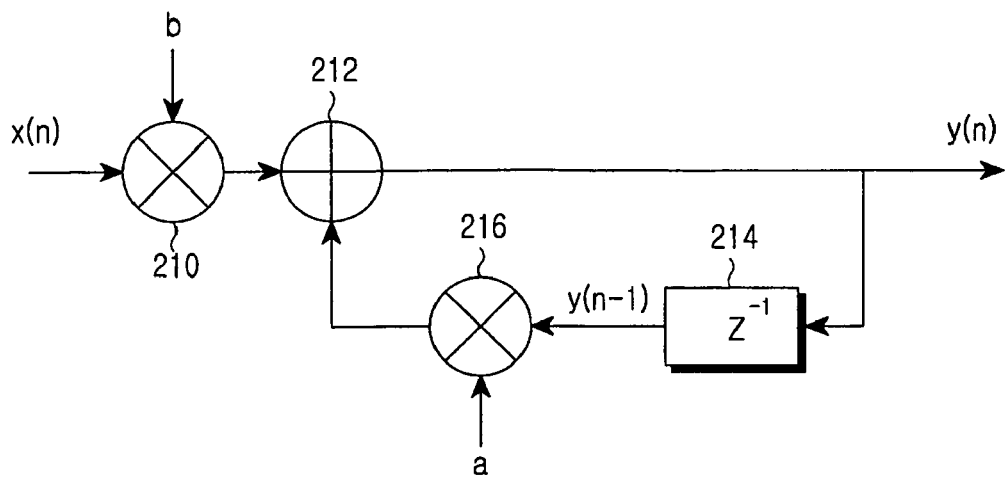
FIG. 2 is a detailed block diagram of an example of a primary IIR filter adapted as an example of a noise elimination filter of FIG. 1.
Figure 3:
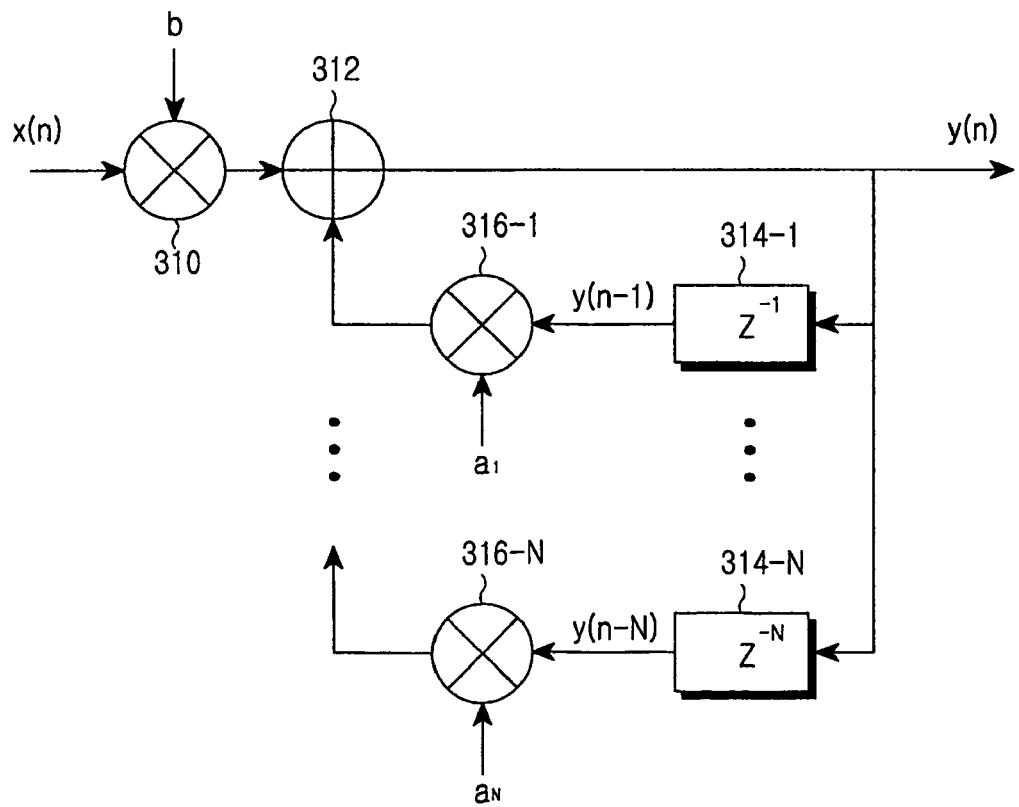
FIG. 3 is a detailed block diagram of an example of an N-th IIR filter adapted as another example of the noise elimination filter of FIG. 1.
Figure 4A:
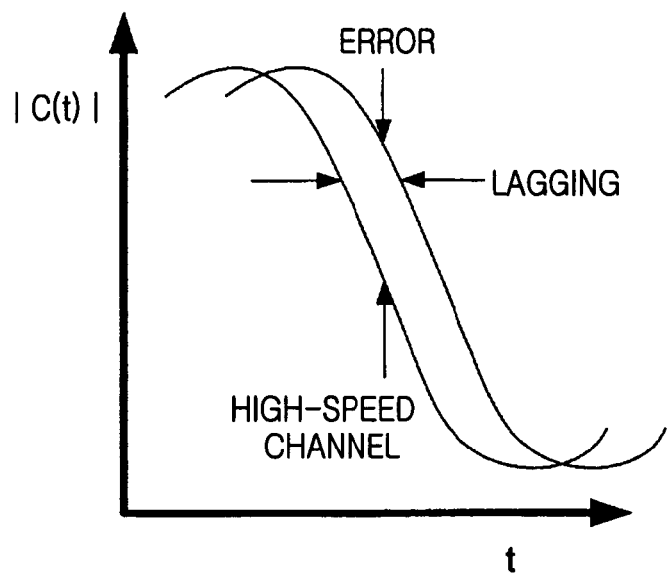
FIG. 4a is a graph illustrating an example of a lagging phenomenon of the IIR filter in a conventional high-speed fading channel.
Figure 4B:
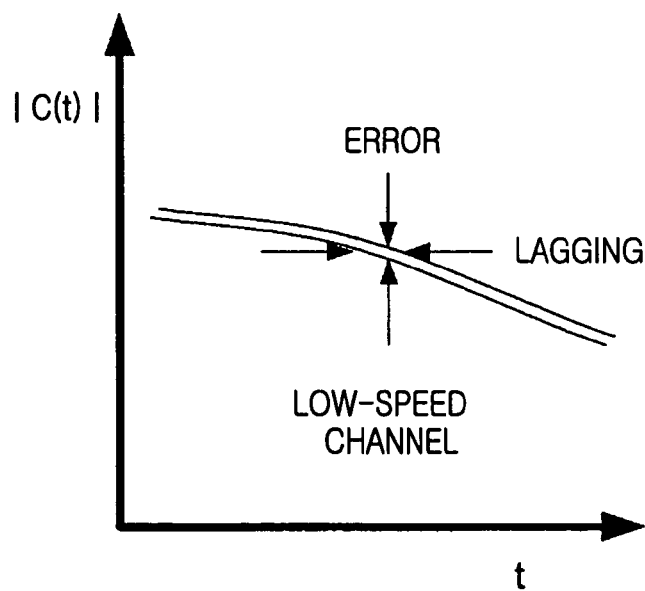
FIG. 4b is a graph illustrating an example of a lagging phenomenon of the IIR filter in a conventional low-speed fading channel.

Embodiments of the present invention will be described in detail with reference to the accompanying drawings. In the drawings, the same or similar elements are denoted by the same reference numerals. In the following description, a detailed description of known functions and configurations incorporated herein will be omitted for conciseness.

Prior to describing the embodiments of the present invention, the characteristics of a noise elimination filter will hereinafter be described in detail.

The noise elimination filter determines its own characteristics according to a filter coefficient composed of a feedback weight "a" and an input weight "b". Provided that a DC gain is "1", the feedback weight "a" and the input weight "b" have a predetermined relationship denoted by |b|=|1−a| in a primary IIR filter, and the feedback weight "a" and the input weight "b" have a predetermined relationship denoted by $$|b| = \left|1 - \sum_{k=1}^{N} a_k\right|$$

in an N-th IIR filter. In other words, the sum of the feedback weight "a" and the input weight "b" is set to a predetermined number of 1. Therefore, if either one of the feedback weight "a" and the input weight "b" is determined, then the other feedback weight is determined. For example, if the feedback weight "a" is set to "½", then the input weight "b" is also set to "½". As a result, the higher the feedback weight "a", the lower the input weight "b", whereas the lower the feedback weight "a", the higher the input weight "b". The feedback weight "a" and the input weight "b" are closely associated with the degree of white noises, i.e., a SNR and a channel speed.

The relationship among filter coefficients "a" and "b", the SNR, and the channel speed will hereinafter be described in detail.

The higher the feedback weight "a" (or the lower the input weight "b"), the higher the noise elimination efficiency of a noise elimination filter, because the feedback weight "a" smoothes a noise level, resulting in effectively removing randomly variable noises. However, the lower the feedback weight "a" (or the higher the input weight "b"), the lower the lagging phenomenon generated from the noise elimination filter, such that the noise elimination filter becomes suitable for a high-speed channel.

The method for predicting the degree of white noise contained in a pilot channel, the method for predicting the paging channel speed, and the method for determining the best feedback weight "a" and the best input weight "b" based on the predicted information will now be described in detail.

A. In the Case where Primary IIR Filter is Adapted as Noise Elimination Filter:

Firstly, it is assumed that a primary IIR filter for determining its own characteristics based on one input weight "b" and one feedback weight "a" is adapted as a noise elimination filter.

Figure 5:
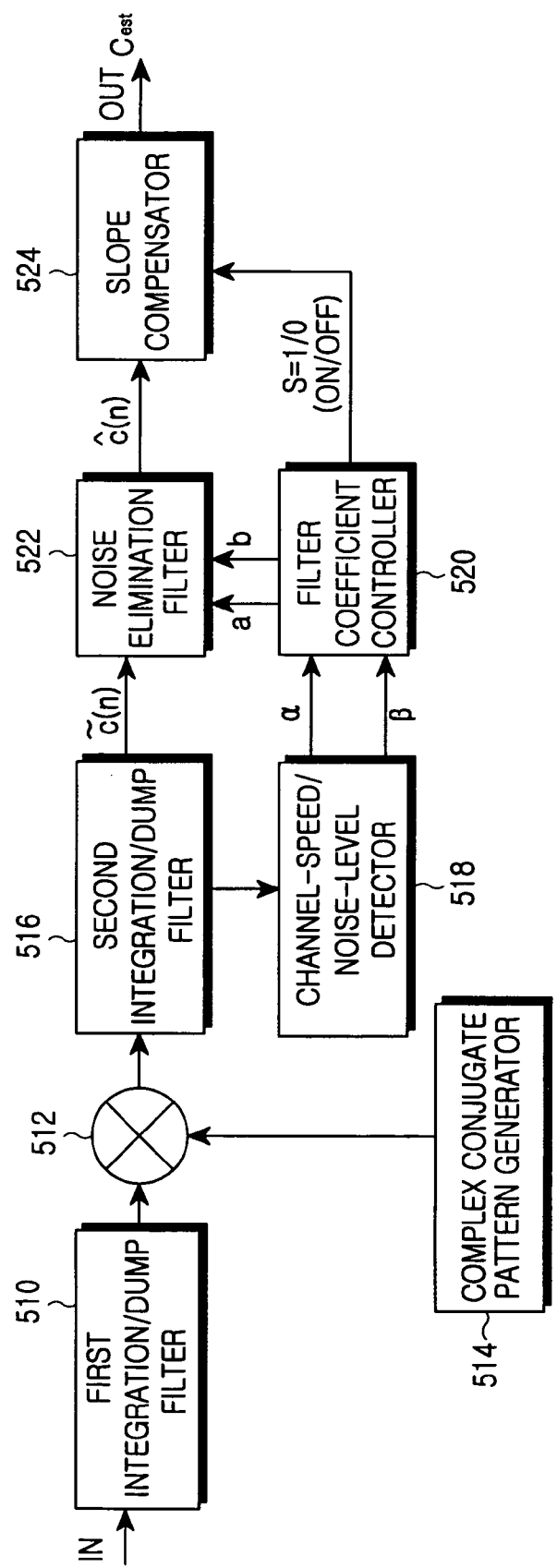
FIG. 5 is a block diagram of an example of a channel estimator in accordance with an embodiment of the present invention.

A1. One Example of Channel Estimator:

The channel estimator will hereinafter be described with reference to FIG. 5. FIG. 5 is a block diagram of an example of a channel estimator in accordance with an embodiment of the present invention. It should be noted that an antenna diversity (i.e., Tx-diversity) is not considered in FIG. 5 for the convenience of description and for a better understanding of the embodiments of the present invention. Although the Tx-diversity is considered in FIG. 5, FIG. 5 further needs only a circuit component for separating each signal from all signals received via many antennas, but this additional circuit component is less associated with the fundamental principle of the present invention.

Referring to FIG. 5, input signals IN are provided to the first integration/dump filter 510. In an embodiment of the present invention, the input signals may be pilot signals received from common pilot channels. The first integration/dump filter 510 accumulates the input signals (i.e., the pilot signals) in response to a SF (Spreading Factor) used for the common pilot channels, and numerically integrates the accumulated input signals. A measurement detected by the first integration/dump filter 510 may be reception intensity in symbol units in association with the input signals. This measurement is provided to a multiplier 512.

A complex conjugate pattern generator 514 generates a complex conjugate pattern corresponding to a symbol pattern of a pilot signal transmitted over the common pilot channel. The complex conjugate pattern generated from the complex conjugate pattern generator 514 is provided to the multiplier 512. The multiplier 512 multiplies the complex conjugate pattern generated from the complex conjugate pattern generator 514 by the measurement generated from the first integration/dump filter 510, and thus generates a subdivided signal corresponding to a desired antenna. The subdivided signal associated with the desired antenna is received from the multiplier 512, and is transmitted to the second integration/dump filter 516. The second integration/dump filter 516 receives subdivided signals for desired antennas from the multiplier 512, accumulates the subdivided signals in two-symbol units, numerically integrates the accumulated signals, and thus outputs a channel prediction value c̃(n). But, this channel prediction value c̃(n) does not consider the white noise contained in the input signals IN. Therefore, the channel prediction value c̃(n) is transmitted to the noise elimination filter 522 to obtain a more accurate value considering the white noise.

The predicted paging channel response c̃(n) received from the integration/dump filter 516 is transmitted to a channel-speed/noise-level detector 518. The channel-speed/noise-level detector 518 detects a noise level $\alpha$ of a pilot channel upon receiving a mean value of differences between the predicted fading channel response c̃(n) and a previously predicted fading channel response c̃(n−1). The channel-speed/noise-level detector 518 calculates an auto-correlation function using the predicted fading channel response c̃(n), and measures a channel speed prediction parameter $\beta$ according to either a minimum auto-correlation function for reflecting a changing rate of a channel or a mean value of a plurality of auto-correlation functions. The sum of the noise level $\alpha$ of the pilot channel and the channel speed prediction parameter $\beta$ is set to a predetermined number such as "1".

Thus, if either one of $\alpha$ and $\beta$ is measured or detected, the other one can be easily determined without an additional measurement process. A method for measuring the noise level $\alpha$ of the pilot channel and a method for measuring the channel speed prediction parameter $\beta$ will hereinafter be described in detail.

The noise level $\alpha$ and the channel speed prediction parameter $\beta$ measured by the channel-speed/noise-level detector 518 are provided to a filter coefficient controller 520. The filter coefficient controller 520 compares the noise level $\alpha$ of the pilot channel and the channel speed prediction parameter $\beta$ with predetermined mapping degrees shown in FIGS. 8 and 10, and thus determines the feedback weight "a" and the input weight "b". In this case, the feedback weight "a" and the input weight "b" should be determined to implement an optimum IIR filter according to a current wireless channel environment. The filter coefficient controller 520 generates a control signal S for controlling operations of a slope compensator 524 upon receiving a channel speed prediction parameter $\beta$. For example, if the channel speed prediction parameter $\beta$ is higher than a predetermined reference value $T_\beta$, the filter coefficient controller 520 controls the slope compensator 524 not to be operated (i.e., S=0). If the channel speed prediction parameter $\beta$ is lower than the predetermined reference value $T_\beta$, the filter coefficient controller 520 controls the slope compensator 524 to be operated (i.e., S=1). A method for determining the feedback weight "a", the input weight "b", and the slope compensation control signal S on the basis of the noise level $\alpha$ and the channel speed prediction parameter $\beta$ will hereinafter be described in detail.

Although the channel-speed/noise-level detector 518 is separate from the filter coefficient controller 520 in FIG. 5, it should be noted that the channel-speed/noise-level detector 518 and the filter coefficient controller 520 may be integrated as one without departing from the scope of the present invention.

The noise elimination filter 522 receives the feedback weight "a" and the input weight "b", and removes a white noise component from a fading channel response c̃(n) predicted by the integration/dump filter 516. The IIR filter may be adapted as the noise elimination filter 522. A channel prediction value ĉ(n) having no white noise component is generated from the noise elimination filter 522, and is then transmitted to the slope compensator 524. The slope compensator 524 compensates for a slope of the channel prediction value ĉ(n) upon receiving a control signal S from the filter coefficient controller 520. For example, if the control signal S of "1" for determining a slope compensation execution is transmitted from the filter coefficient controller 520 to the slope compensator 524, then the slope compensator 524 compensates for the slope of the channel prediction value ĉ(n). Otherwise, if the control signal S of "0" for determining a slope compensation execution is transmitted from the filter coefficient controller 520 to the slope compensator 524, then the slope compensator 524 outputs the channel prediction value ĉ(n) as it is without any compensation of the slope of the value ĉ(n). A detailed operation of the slope compensator 524 for compensating the slope of the channel prediction value ĉ(n) will hereinafter be described in detail.

FIG. 5 shows a block diagram of an apparatus for predicting optimum filter coefficients "a" and "b" according to a variable wireless channel environment using the channel-speed/noise-level detector 518 and the filter coefficient controller 520. According to an embodiment of the present invention, the noise elimination filter 522 can optimally remove a white noise according to a current wireless channel environment.

A2. Method for Measuring Noise Level α of Pilot Channel:

A method for measuring the noise level α of the pilot channel using the fading channel response c̃(n) predicted by the channel-speed/noise-level detector 518 will now be described in detail.

A complex pilot channel h(n) after despreading reception pilot channels can be represented by the following Equation 7:

$$h(n) = A_p \cdot S_p \cdot c(n) + N(n) \quad \text{[Equation 7]}$$

where $A_p$ is a magnitude (e.g., a signal amplitude) of a pilot channel; $s_p$ is 1+j, and serves as a pilot symbol; c(n) is a paging channel response that is accumulated and averaged using a spreading factor $SF_{pilot}$ of the pilot channel; and N(n) is a white noise. On the other hand, "n" is set to one of 1 to $M_{pilot}$, and the $M_{pilot}$ is the number of pilot symbols for every packet.

The predicted fading channel response c̃(n) applied to an input terminal of the channel-speed/noise-level detector 518 is derived by multiplying a complex conjugate $s_p^*$ of a corresponding pilot symbol by the complex pilot channel h(n). The predicted fading channel response c̃(n) can be represented by the following Equation 8:

$$\tilde{c}(n) = h(n) \bullet \frac{s_p^*}{2} \quad \text{[Equation 8]}$$
$$= A_p \bullet c(n) \bullet s_p \bullet \frac{s_p^*}{2} + N(n) \bullet \frac{s_p^*}{2}$$
$$= A_p \bullet c(n) + N_1(n)$$

Figure 6A:
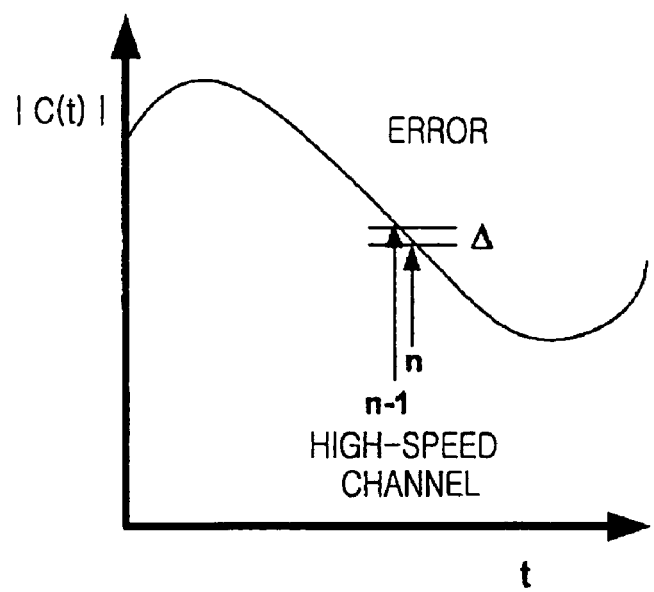
FIG. 6a is a graph illustrating an example of a difference between a plurality of values adjacent to each other in a high-speed channel when a general channel estimation is performed in accordance with an embodiment of the present invention.
Figure 6B:
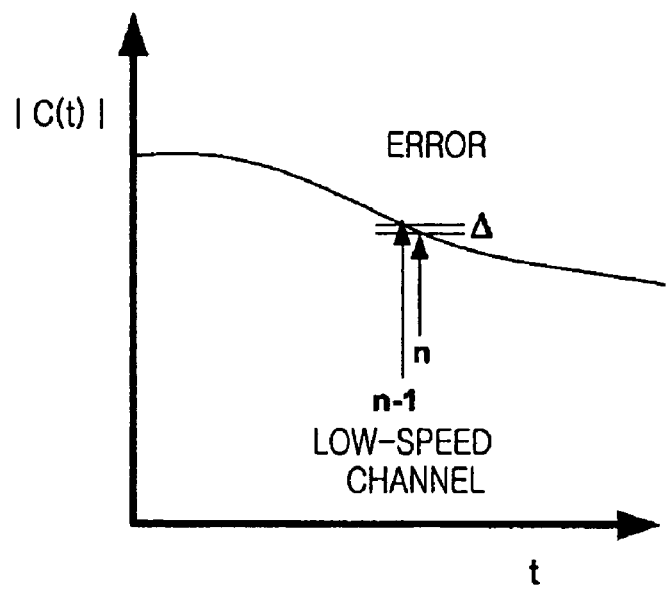
FIG. 6b is a graph illustrating an example of a difference between a plurality of values adjacent to each other in a low-speed channel when a general channel estimation is performed in accordance with an embodiment of the present invention.

Because a real fading channel c(n) is configured in the form of a continuously changing sinusoidal wave (Sin), a nearby value such as a difference Δ=c(n)−c(n−1) between c(n) and c(n−1) is determined differently by a channel speed as shown in FIGS. 6A and 6B, such that the nearby value is approximately close to "0". Specifically, FIG. 6a is a graph illustrating an example of a difference between a plurality of values adjacent to each other in a high-speed channel when a general channel estimation is performed in accordance with an embodiment of the present invention. FIG. 6b is a graph illustrating an example of a difference between a plurality of values adjacent to each other in a low-speed channel when a general channel estimation is performed in accordance with an embodiment of the present invention. Therefore, a mean value a of differences between the predicted fading channel response c̃(n) and the previously predicted fading channel response c̃(n−1) can be calculated by the following Equation 9:

$$\alpha = \frac{1}{M_{pilot}} \sum_{n=1}^{M_{pilot}} |\tilde{c}(n) - \tilde{c}(n-1)| \quad \text{[Equation 9]}$$
$$= \frac{1}{M_{pilot}} \sum_n |A_p \bullet c(n) + N_1(n) - A_p \bullet c(n-1) - N_1(n-1)|$$
$$\approx \frac{1}{M_{pilot}} \sum_n |N_1(n) - N_1(n-1)|$$

Referring to the Equation 9, a fading channel component $A_p$ derived by multiplication of c̃(n) and c̃(n−1) is eliminated to leave only noise components in such a way that a noise level of the pilot channel is recognized.

As shown in the Equation 9, the difference between the predicted fading channel response c̃(n) and the previously predicted fading channel response c̃(n−1) delayed by one symbol is close to "0", such that only a noise component |$N_1(n)-N_1(n-1)$| is calculated while the fading channel component $A_p$ is eliminated. Provided that a mean value of noise components calculated by all the predicted fading channel responses c̃(n) is calculated, a noise level α of the pilot channel can be approximately measured. Because the mean value of the noise components is proportional to N(n) as denoted by α·N(n), a mean value of the noise components can be adapted as an index for indicating a noise level α of the pilot channel.

A3. Method for Measuring Channel Speed Prediction Parameter β:

A method for measuring a channel speed prediction parameter β using a fading channel response c̃(n) predicted by the channel-speed/noise-level detector 518 shown in FIG. 5 will hereinafter be described in detail.

An auto-correlation function $R_{\tilde{c}(n)}(l)$ using an output signal c̃(n)=$A_p$·c(n)+$N_1$(n) of the integration/dump filter 516 can be calculated by the following Equation 10:

$$R_{\tilde{c}(n)}(l) = \sum_{n=1}^{M_{pilot}} |\tilde{c}(n)| \bullet |\tilde{c}(n+l)| \quad \text{[Equation 10]}$$

As shown in the Equation 9, a minimum value or a mean value of auto-correlation functions calculated by the Equation 10 reflects a variation of channel speeds therein. Therefore, the channel speed prediction parameter β can be represented by the following Equation 11:

$$\beta = \min[R_{\tilde{c}}(l)/\max(R_{\tilde{c}})] \text{ or} \quad \text{[Equation 11]}$$
$$\beta = \text{mean}[R_{\tilde{c}}(l)/\max(R_{\tilde{c}})]$$

where β satisfies a predetermined condition 0≦β≦1. The channel speed prediction parameter β is provided in the form of a normalization of the auto-correlation function, and thus sufficiently designates a variation of channel conditions. Specifically, when using a slow fading mode during which there is little variation of channel environments, the channel speed prediction parameter β is approximately close to "1". When using a fast fading mode during which a channel condition or environment is abruptly changed, the parameter β is approximately close to "0".

A4. Method for Determining Feedback Weight "a" and Input Weight "b":

A noise level α and a channel speed prediction parameter β of the pilot channel can be determined by the filter coefficient controller 520 shown in FIG. 5, and this method for determining the noise level α and the channel speed prediction parameter β will now be described in detail. The feedback weight "a" and the input weight "b" are distinguished from each other according to a determination method based on a single reference value $T_\alpha$ or $T_\beta$ and other determination method based on multi-level reference values $T_{\alpha_1}$, $T_{\alpha_2}$, $T_{\beta_1}$, and $T_{\beta_2}$.

A method for determining the feedback weight "a" and the input weight "b" on the basis of a single-level reference value will hereinafter be described with reference to FIGS. 7a, 7b, and 8.

Figure 7A:
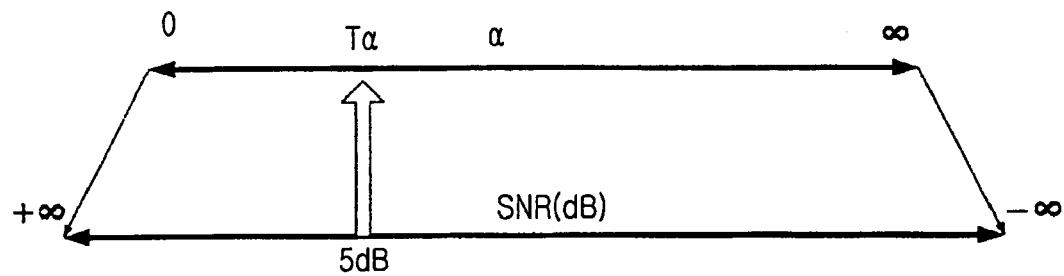
FIG. 7a is a graph illustrating an example of a SNR associated with a single-level reference value and a SNR associated with the amount of noise of a detected pilot channel in accordance with an embodiment of the present invention.
Figure 7B:
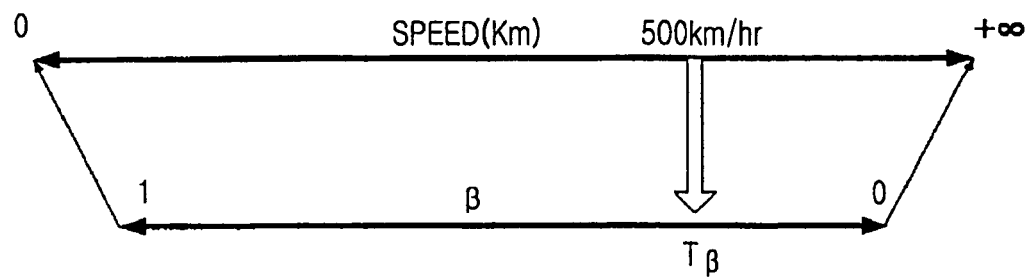
FIG. 7b is a graph illustrating an example of a channel speed associated with a single-level reference value and a channel speed associated with a detected channel speed prediction parameter in accordance with an embodiment of the present invention.

FIG. 7a is a graph illustrating an example of a SNR associated with a single-level reference value and a SNR associated with the amount of noise of a detected pilot channel in accordance with an embodiment of the present invention. FIG. 7b is a graph illustrating an example of a channel speed associated with a single-level reference value and a channel speed associated with a detected channel speed prediction parameter in accordance with an embodiment of the present invention. Specifically, FIG. 7a is an example of a real mapping-processed SNR(dB) in response to a single-level reference value and a noise level $\alpha$ of a measured pilot channel. FIG. 7b is an example of a real mapping-processed channel speed in response to a single-level reference value and a channel speed prediction parameter $\beta$.

Figure 8:
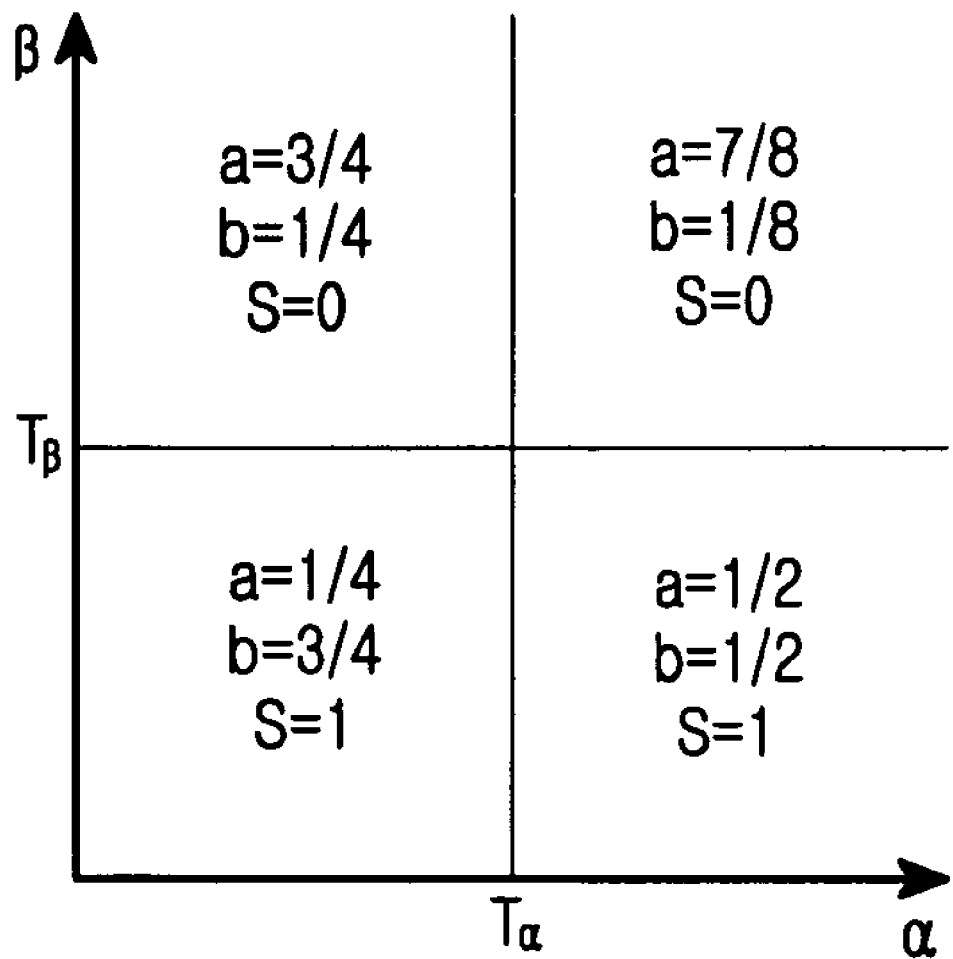
FIG. 8 is a graph illustrating an example of a mapping of filter coefficients corresponding to a plurality of measurements when a single-level reference value is adapted to the present invention in accordance with an embodiment of the present invention.

FIG. 8 is a graph illustrating an example of a mapping example of filter coefficients corresponding to a plurality of measurements when a single-level reference value is adapted to the present invention in accordance with an embodiment of the present invention. Specifically, FIG. 8 is an example where the feedback weight "a", the input weight "b", and a slope control signal "S" are optimally mapping-processed according to the noise level $\alpha$ of a measured pilot channel and the channel speed prediction parameter $\beta$ when using single-level reference values $T_\alpha$ and $T_\beta$.

Upon receiving a noise level $\alpha$ from the channel-speed/noise-level detector 518, the filter coefficient controller 520 determines a SNR(dB) corresponding to $\alpha$ on the basis of the graph shown in FIG. 7a. The filter coefficient controller 520 compares the determined SNR with a SNR(dB) of the reference value $T_\alpha$. Upon receiving the channel speed prediction parameter $\beta$ from the channel-speed/noise-level detector 518, the filter coefficient controller 520 determines a channel speed corresponding to $\beta$ on the basis of the graph shown in FIG. 7b. In this case, the reference values $T_\alpha$ and $T_\beta$ function as a conversion point for converting mapping rules of the filter coefficients "a" and "b" into another mapping rule, and may be differently adapted according to a hardware structure and performance of individual receivers. The structure and performance of the receivers are determined differently according to a system designer or a system standard. The SNR value (dB) corresponding to $T_\alpha$ and the channel speed (km) corresponding to $T_\beta$ are calculated by a receiver's performance test. That is, the SNR(dB) corresponding to $T_\alpha$ and the channel speed corresponding to $T_\beta$ are determined using many tests performed by users.

Upon receiving the comparing results associated with SNRs and channel speeds, the filter coefficient controller 520 determines the feedback weight "a", the input weight "b" and a control signal S on the basis of mapping degrees shown in FIG. 8. The control signal S is adapted to determine whether a slope is compensated or not. Four mapping rules in response to the above comparing results are shown in FIG. 8 illustrating various mapping degrees. Referring to FIG. 8, a predetermined area of more than 5 dB is adapted as a low-noise area in the case of SNR, and a predetermined channel of more than 500 km is adapted as a high-speed channel.

Firstly, if a prescribed condition of $\beta>T_\beta$ and $\alpha<T_\alpha$ is provided, the filter coefficient controller 520 sets the feedback weight "a" to ¾, and sets the input weight "b" to ¼, as shown in the mapping degrees of FIG. 8. Further, a slope control signal S is set to "0" for disabling a slope compensation function.

Secondly, if a prescribed condition of $\beta>T_\beta$ and $\alpha>T_\alpha$ is provided, the filter coefficient controller 520 sets the feedback weight "a" to ⅞, and sets the input weight "b" to ⅛, as shown in the mapping degrees of FIG. 8. Further, a slope control signal S is also set to "0" for disabling a slope compensation function.

Thirdly, if a prescribed condition of $\beta<T_\beta$ and $\alpha<T_\alpha$ is provided, the filter coefficient controller 520 sets the feedback weight "a" to ¼, and sets the input weight "b" to ¾, as shown in the mapping degrees of FIG. 8. Further, a slope control signal S is set to "1" for activating a slope compensation function.

Fourth, if a prescribed condition of $\beta<T_\beta$ and $\alpha>T_\alpha$ is provided, the filter coefficient controller 520 sets the feedback weight "a" to ½, and sets the input weight "b" to ½, as shown in the mapping degrees of FIG. 8. Further, a slope control signal S is set to "1" for activating a slope compensation function.

A method for determining the feedback weight "a" and the input weight "b" on the basis of multi-level reference values will hereinafter be described with reference to FIGS. 9a, 9b, and 10.

Figure 9A:
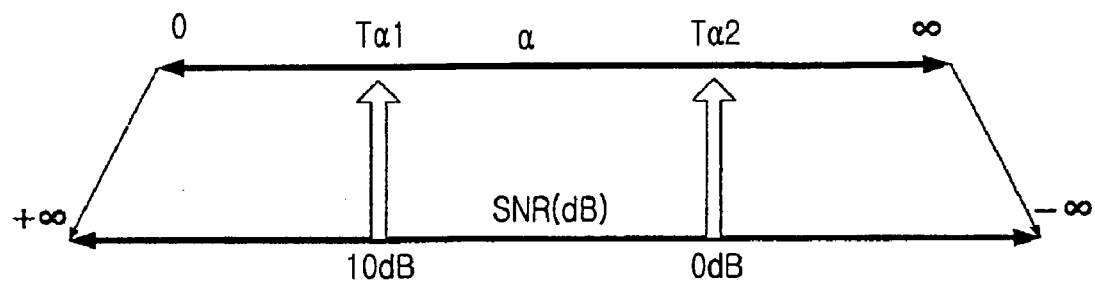
FIG. 9a is a graph illustrating an example of a SNR associated with a multi-level reference value and a SNR associated with the amount of noise of a detected pilot channel in accordance with an embodiment of the present invention.
Figure 9B:
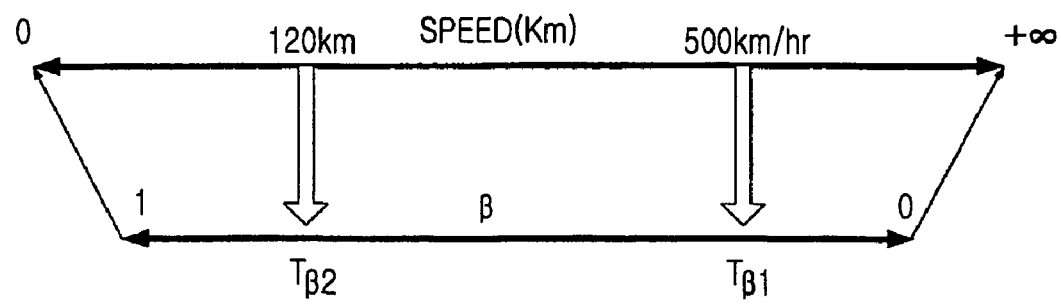
FIG. 9b is a graph illustrating an example of a channel speed associated with a multi-level reference value and a channel speed associated with a detected channel speed prediction parameter in accordance with an embodiment of the present invention.

FIG. 9a is a graph illustrating an example of a SNR associated with a multi-level reference value and a SNR associated with the amount of noise of a detected pilot channel in accordance with an embodiment of the present invention. FIG. 9b is a graph illustrating an example of a channel speed associated with a multi-level reference value and a channel speed associated with a detected channel speed prediction parameter in accordance with an embodiment of the present invention. FIG. 10 is a graph illustrating an example of a mapping example of filter coefficients corresponding to a plurality of measurements when multi-level reference values are adapted to the present invention in accordance with an embodiment of the present invention. FIG. 9a is an example of a real mapping-processed SNR(dB) in response to multi-level reference values and a noise level $\alpha$ of a measured pilot channel. FIG. 9b is an example of a real mapping-processed channel speed in response to multi-level reference values and a channel speed prediction parameter $\beta$. FIG. 10 is an example where the feedback weight "a", the input weight "b", and a slope control signal "S" are optimally mapping-processed according to the noise level $\alpha$ of a measured pilot channel and the channel speed prediction parameter $\beta$ in the case of using multi-level reference values $T_{\alpha_1}$, $T_{\alpha_2}$, $T_{\beta_1}$, and $T_{\beta_2}$. In this case, FIG. 9a shows three areas on the basis of specific values of 0 dB ($T_{\alpha_2}$) and 10 dB ($T_{\alpha_1}$), i.e., a low-noise area, an intermediate-noise area, and a high-noise area. In the case of a channel speed, FIG. 9b shows three areas on the basis of specific values of 120 km ($T_{\beta_2}$) and 10 dB ($T_{\beta_1}$), i.e., a low-speed channel area, an intermediate-speed channel area, and a high-noise channel area.

Upon receiving an output signal $\alpha$ from the channel-speed/noise-level detector 518, the filter coefficient controller 520 compares a SNR(dB) value corresponding to a noise level $\alpha$ of a pilot channel with individual SNR(dB) values corresponding to the reference values $T_{\alpha_1}$ and $T_{\alpha_2}$. Upon receiving an output signal $\beta$ from the channel-speed/noise-level detector 518, the filter coefficient controller 520 compares a channel speed corresponding to the channel speed prediction parameter $\beta$ with individual channel speeds corresponding to the reference values $T_{\beta_1}$ and $T_{\beta_2}$.

Figure 10:
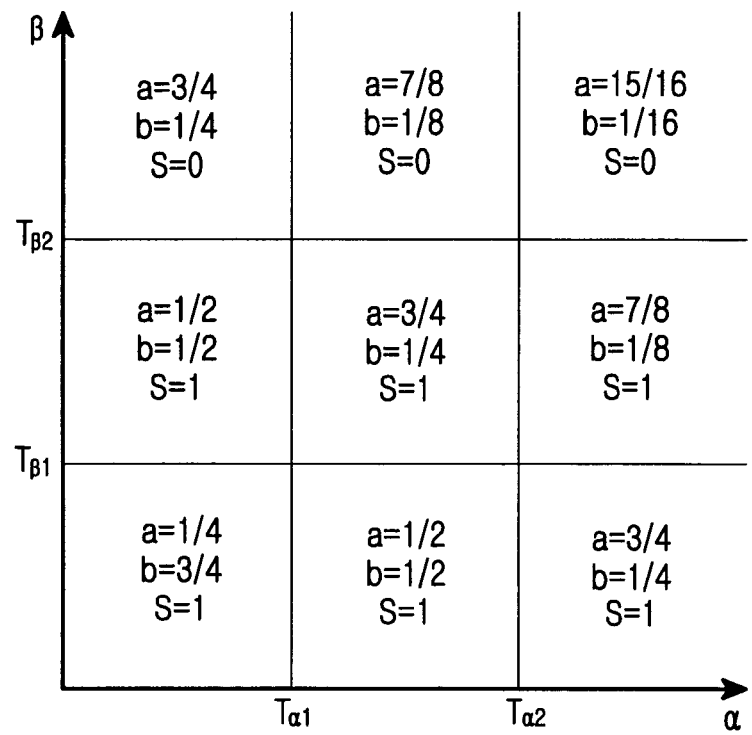
FIG. 10 is a graph illustrating an example of a mapping of filter coefficients corresponding to a plurality of measurements when multi-level reference values are adapted to the present invention in accordance with an embodiment of the present invention.

Upon receiving the comparing results associated with SNRs and channel speeds, the filter coefficient controller 520 determines the feedback weight "a", the input weight "b" and a control signal S on the basis of mapping degrees shown in FIG. 10. In this case, the control signal S is adapted to determine whether a slope is compensated or not. Nine mapping rules in response to the above comparing results are shown in FIG. 10 illustrating various mapping degrees.

Firstly, if a prescribed condition of $\beta>T_{\beta_2}$ and $\alpha<T_{\alpha_1}$ is provided, the filter coefficient controller 520 sets the feedback weight "a" to ¾, and sets the input weight "b" to ¼, as shown in the mapping degrees of FIG. 10. Further, a slope control signal S is set to "0" for disabling a slope compensation function.

Secondly, if a prescribed condition of $\beta>T_{\beta_2}$ and $T_{\alpha_1}<\alpha<T_{\alpha_2}$ is provided, the filter coefficient controller 520 sets the feedback weight "a" to ⅞, and sets the input weight "b" to ⅛, as shown in the mapping degrees of FIG. 10. Further, a slope control signal S is also set to "0" for disabling a slope compensation function.

Thirdly, if a prescribed condition of $\beta>T_{\beta_2}$ and $\alpha>T_{\alpha_2}$ is provided, the filter coefficient controller 520 sets the feedback weight "a" to 15/16, and sets the input weight "b" to 1/16, as shown in the mapping degrees of FIG. 10. Further, a slope control signal S is also set to "0" for disabling a slope compensation function.

Fourth, if a prescribed condition of $T_{\beta_2}<\beta<T_{\alpha_1}$ and $\alpha<T_{\alpha 1}$ is provided, the filter coefficient controller 520 sets the feedback weight "a" to ½, and sets the input weight "b" to ½, as shown in the mapping degrees of FIG. 10. Further, a slope control signal S is set to "1" for activating a slope compensation function.

Fifth, if a prescribed condition of $T_{\beta_2}<\beta<T_{\beta_1}$ and $T_{\alpha_1}<\alpha<T_{\alpha_2}$ is provided, the filter coefficient controller 520 sets the feedback weight "a" to ¾, and sets the input weight "b" to ¼, as shown in the mapping degrees of FIG. 10. Further, a slope control signal S is set to "1" for activating a slope compensation function.

Sixth, if a prescribed condition of $T_{\beta_2}<\beta<T_{\beta_1}$ and $\alpha>T_{\alpha_2}$ is provided, the filter coefficient controller 520 sets the feedback weight "a" to ⅞, and sets the input weight "b" to ⅛, as shown in the mapping degrees of FIG. 10. Further, a slope control signal S is set to "1" for activating a slope compensation function.

Seventh, if a prescribed condition of $\beta<T_{\beta_1}$ and $\alpha<T_{\alpha_1}$ is provided, the filter coefficient controller 520 sets the feedback weight "a" to ¼, and sets the input weight "b" to ¾, as shown in the mapping degrees of FIG. 10. Further, a slope control signal S is set to "1" for activating a slope compensation function.

Eighth, if a prescribed condition of $\beta<T_{\beta_1}$ and $T_{\alpha_1}<\alpha<T_{\alpha_2}$ is provided, the filter coefficient controller 520 sets the feedback weight "a" to ½, and sets the input weight "b" to ½, as shown in the mapping degrees of FIG. 10. Further, a slope control signal S is set to "1" for activating a slope compensation function.

Ninth, if a prescribed condition of $\beta<T_{\beta_1}$ and $\alpha>T_{\alpha_2}$ is provided, the filter coefficient controller 520 sets the feedback weight "a" to ¾, and sets the input weight "b" to ¼, as shown in the mapping degrees of FIG. 10. Further, a slope control signal S is set to "1" for activating a slope compensation function.

The above mapping examples shown in FIGS. 8 and 10 define filter coefficients for enabling a noise elimination filter 522 to perform an optimum function. In an embodiment of the present invention, the optimum filter coefficients can be implemented using a receiver's performance test.

A5. Slope Compensation Method

A method for controlling a slope compensator 524 to perform a slope compensation according to a channel speed prediction parameter β will now be described in detail.

It should be noted that the following slope compensation method is controlled by the filter coefficient controller 520 according to a channel speed. The slope compensation is determined by the channel speed because the slope compensation effect is shown differently according to the channel speed. Specifically, the slope compensation effect in either a high-speed channel or a wireless channel environment of a high SNR is relatively high, whereas the slope compensation effect in either a low-speed channel or a wireless channel environment of a low SNR is relatively low, because a ratio of channel variation rate $\Delta=c(n)-c(n-1)$ to a noise $N(n)$ is relatively high in the high-speed channel. Thus, a probability of creating a channel compensation value $\Lambda(n)$ is relatively high. Therefore, it is preferable for the slope compensation to be performed when the ratio $\Delta/N(n)$ of channel variation rate to noise is sufficiently provided.

When using the single-level reference values $T_\alpha$ and $T_\beta$ shown in FIG. 8, if a predetermined condition of $\beta>T_\beta$ is provided, S is set to "0", such that the slope compensation is not performed. Otherwise, if a predetermined condition of $\beta\leq T_\beta$ is provided, S is set to "1", such that the slope compensation is performed.

When using the multi-level reference values $T_{\alpha_1}$, $T_{\alpha_2}$, $T_{\beta_1}$ and $T_{\beta_2}$ shown in FIG. 10, if a predetermined condition of $\beta>T_{\beta_2}$ is provided, S is set to "0", such that the slope compensation is not performed. Otherwise, if a predetermined condition of $\beta\leq T_{\beta_2}$ is provided, S is set to "1", such that the slope compensation is performed.

Figure 11:
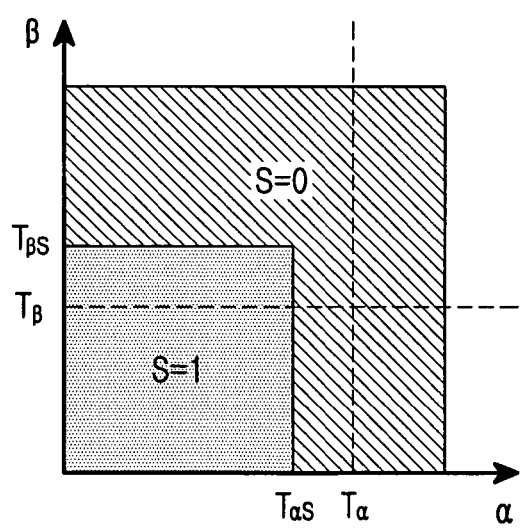
FIG. 11 is a graph illustrating an example where an independent reference value is adapted to determine whether a slope is compensated or not in accordance with an embodiment of the present invention.
Figure 12:
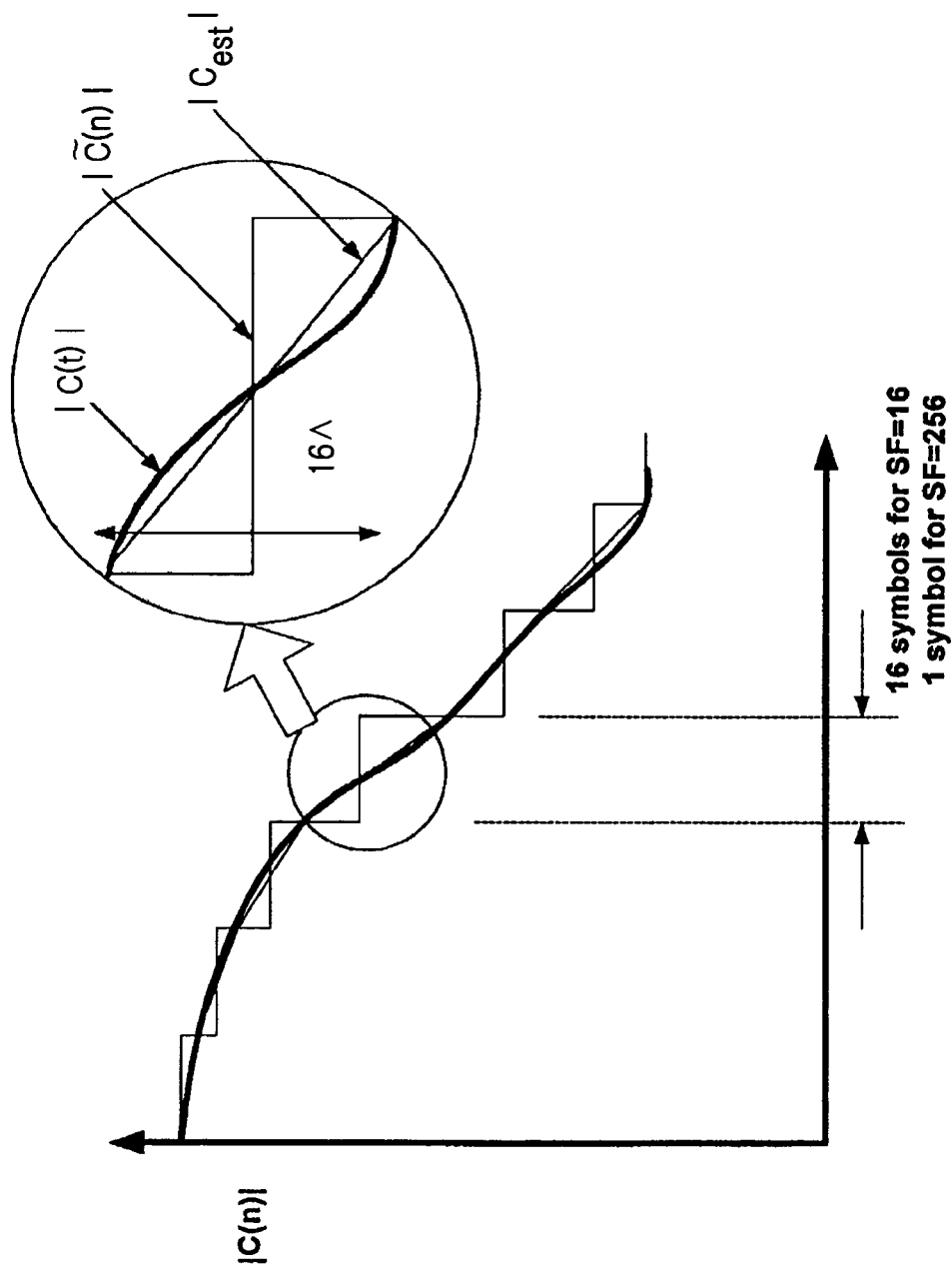
FIG. 12 is a graph illustrating an example of a principle of the slope compensation in accordance with an embodiment of the present invention.

However, although $T_\beta$ is adapted as a reference value for setting S to "0" or "1", an additional reference value other than $T_\beta$ may be selectively adapted if needed. In order to determine the signal S differently from the reference values $T_\alpha$ and $T_\beta$ for determining filter coefficients, FIG. 11 shows an example where reference values $T_{\alpha s}$ and $T_{\beta s}$ are adapted independently from each other. Specifically, FIG. 11 is a graph illustrating an example where an independent reference value is adapted to determine whether a slope is compensated or not in accordance with an embodiment of the present invention The slope compensator 524 is connected to the last end of a channel estimator in order to adjust filter coefficients based on α and β while improving another performance. The principle of the slope compensation can be recognized by a difference between a pilot channel SF $SF_{data}$ and a data channel SF $SF_{pilot}$. Typically, the $SF_{pilot}$ is considerably higher than the $SF_{data}$. For example, if the $SF_{pilot}$ is 256, the $SF_{data}$ is 16. In this case, the number of data symbols for every symbol is 16. Therefore, a channel compensation value predicted by one pilot symbol is equally applied to 16 data symbols. Provided that a Tx-diversity also called an antenna diversity is considered, 32 data symbols are channel-compensated by a channel compensation value predicted by one pilot symbol. This fact is clearly shown in FIG. 12 which is a graph illustrating an example of the principle of slope compensation in accordance with an embodiment of the present invention.

Therefore, it is preferable for the channel estimator to predict a slope status of a current channel and respectively apply different channel compensation values to 16 data symbols. Different channel compensation values $\Lambda(n)$ determined by individual data symbols can be represented by the following Equation 12:

$$\Lambda(n) = \frac{1}{W \bullet (SF_{pilot}/SF_{data})} \sum_{w=0}^{w-1} |\hat{c}(n-w) - \hat{c}(n-w-1)| \quad \text{[Equation 12]}$$

where n is an index of a pilot symbol contained in one packet, and w is a size of window used for slope prediction.

If the channel compensation value $\Lambda(n)$ calculated by the Equation 12 is applied to the signal $\hat{c}(n)$ having no noise, an output signal of the slope compensator 524 can be calculated by the following Equation 13:

$$c_{est}(n,k) = \hat{c}(n) \cdot k \cdot \Lambda(n) \quad \text{[Equation 13]}$$

where $c_{est}(n,k)$ is a channel-compensated output signal of k-th data symbol with respect to an n-th pilot symbol, k is $1 \leq k \leq SF_{pilot}/SF_{data}$, and $SF_{pilot}/SF_{data}$ is the number of data symbols associated with one pilot symbol. Therefore, the number of data symbols for every packet can be denoted by $M_{pilot} \times SF_{pilot}/SF_{data}$.

A6. Operations of Preferred Embodiment of the Present Invention

Operations of a channel estimator in accordance with a preferred embodiment of the present invention will hereinafter be described with reference to FIG. 13 which is a flow chart illustrating an example of operations of the channel estimator in accordance with an embodiment of the present invention.

Figure 13:
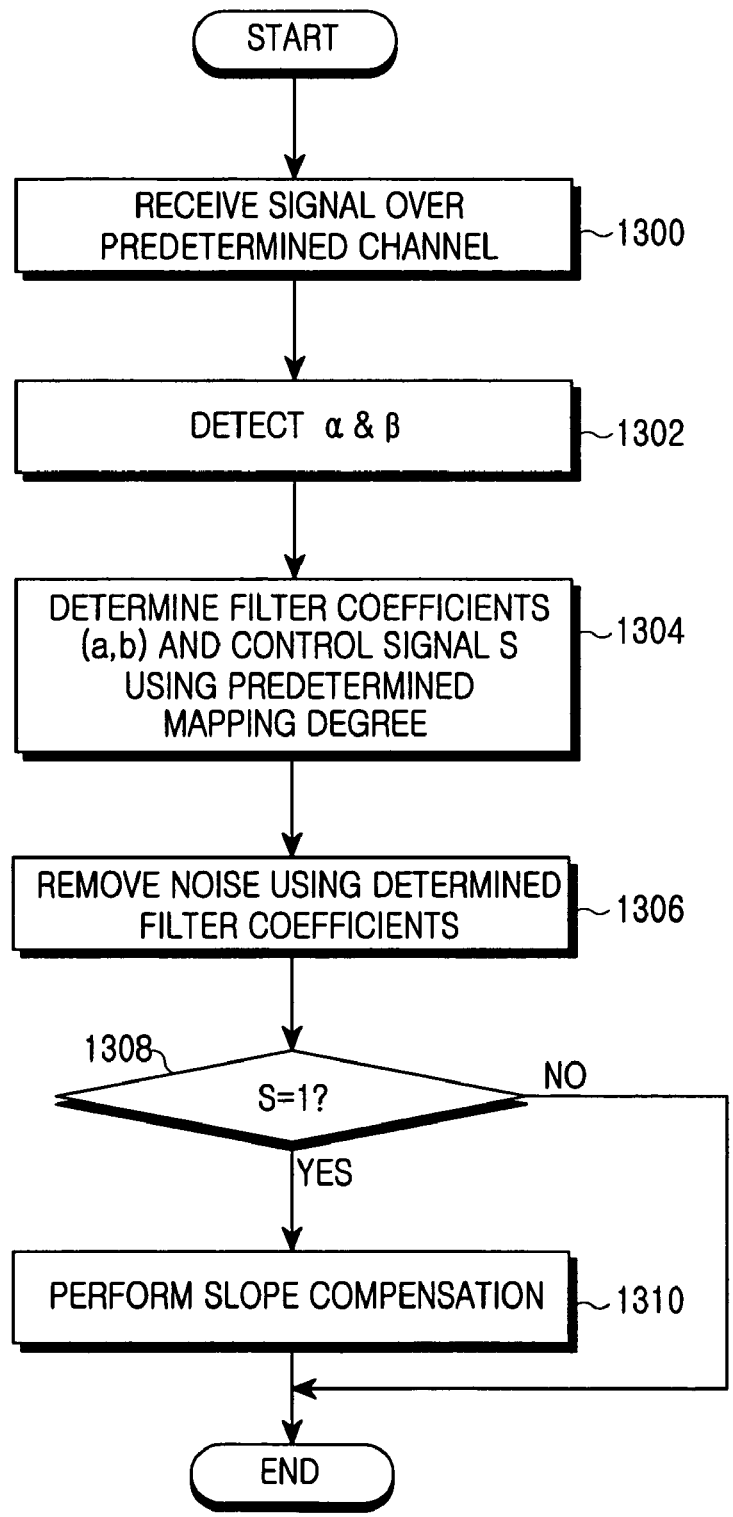
FIG. 13 is a flow chart illustrating an example of operations of the channel estimator in accordance with an embodiment of the present invention.

Referring to FIG. 13, a channel estimator receives a predetermined channel signal from a transmitter at step 1300. In this case, the predetermined channel signal is a channel signal for recognizing information of a wireless channel environment, and, in an embodiment of the present invention, may be a pilot signal received over a common pilot channel. The above step 1300 includes a variety of operations executed in the first integration/dump filter 510, the multiplier 512, and the second integration/dump filter 516. Upon receiving the predetermined channel signal at step 1300, then the channel estimator goes to step 1302 to measure a noise level α of a pilot channel and a channel speed prediction parameter β, that are associated with the predetermined channel signal, using the channel-speed/noise-level detector 518. If the noise level α of the pilot channel and the channel speed prediction parameter β is detected at step 1302, the channel estimator goes to step 1304. The filter coefficient controller 520 of the channel estimator provides the noise level α of the pilot channel and the channel speed prediction parameter β to a predetermined mapping degree at step 1304, and thus determines filter coefficient "a" and "b" for optimally coping with a current wireless channel environment and a control signal S for determining whether a slope is compensated or not. The filter coefficient is information required by the noise elimination filter 522, and includes the feedback weight "a" and the input weight "b". The determined filter coefficients "a" and "b" is provided to the noise elimination filter 522, and the control signal is provided to the slope compensator 524. A noise component may be contained in the predetermined channel signal. Upon receiving filter coefficients "a" and "b" from the filter coefficient controller 520, the noise elimination filter 522 removes the noise component from the predetermined channel signal using the received filter coefficients "a" and "b" at step 1306. The slope compensator 524 determines whether a slope compensation is adapted to the predetermined channel signal having no noise at step 1308. Specifically, if S=1, the slope compensator 524 determines that slope compensation is requested. Otherwise, if S=0, the slope compensator 524 determines that slope compensation is not requested. The slope compensator 524 goes to step 1310 upon receiving the slope compensation request signal, and performs slope compensation of the predetermined channel signal having no noise at step 1310. Otherwise, if slope compensation is not requested at step 1308, the channel estimator terminates a control program without executing the step 1310.

B. In the Case Where N-th IIR Filter is Adapted as Noise Elimination Filter:

The filter coefficients "a" and "b" determined by the configuration and operations of the aforementioned embodiment of the present invention may be equally applied to the primary noise elimination filter and the N-th noise elimination filter. However, the filter coefficients "a" is implemented differently according to the characteristics of the N-th noise elimination filter. Specifically, when using the N-th noise elimination filter, different filter coefficients $a_1$ to $a_n$ are respectively assigned to N noise elimination filters such as a filter coefficient "a". This distribution method may be classified into an equal distribution method and an unequal distribution method.

In the case of the equal distribution method, a result value derived by division between "a" and the number N of feedback signals is adapted as feedback weights $a_1$ to $a_n$ associated with individual feedback signals. In other words, the weights $a_1$ to $a_N$ associated with individual feedback signals can be defined as $a_1 = a_2 = \ldots = a_N = a/N$.

The unequal distribution method controls the coefficient "a" to satisfy a predetermined condition of $W_1 a_1 + W_2 a_2 + \ldots + W_N a_N = a$ when distributing the determined value "a" to individual feedback weights $a_1$ to $a_N$. In this case, although $W_1$ to $W_N$ are assigned different weights, they must preferably satisfy a prescribed condition of $$\sum_{k=1}^{N} W_k.$$

Each of $W_1$ to $W_N$ can be adjusted when designing a noise elimination filter, they must preferably satisfy a predetermined condition of $W_1 > W_2 > \ldots > W_N$.

C. Performance Comparison

Figure 14:
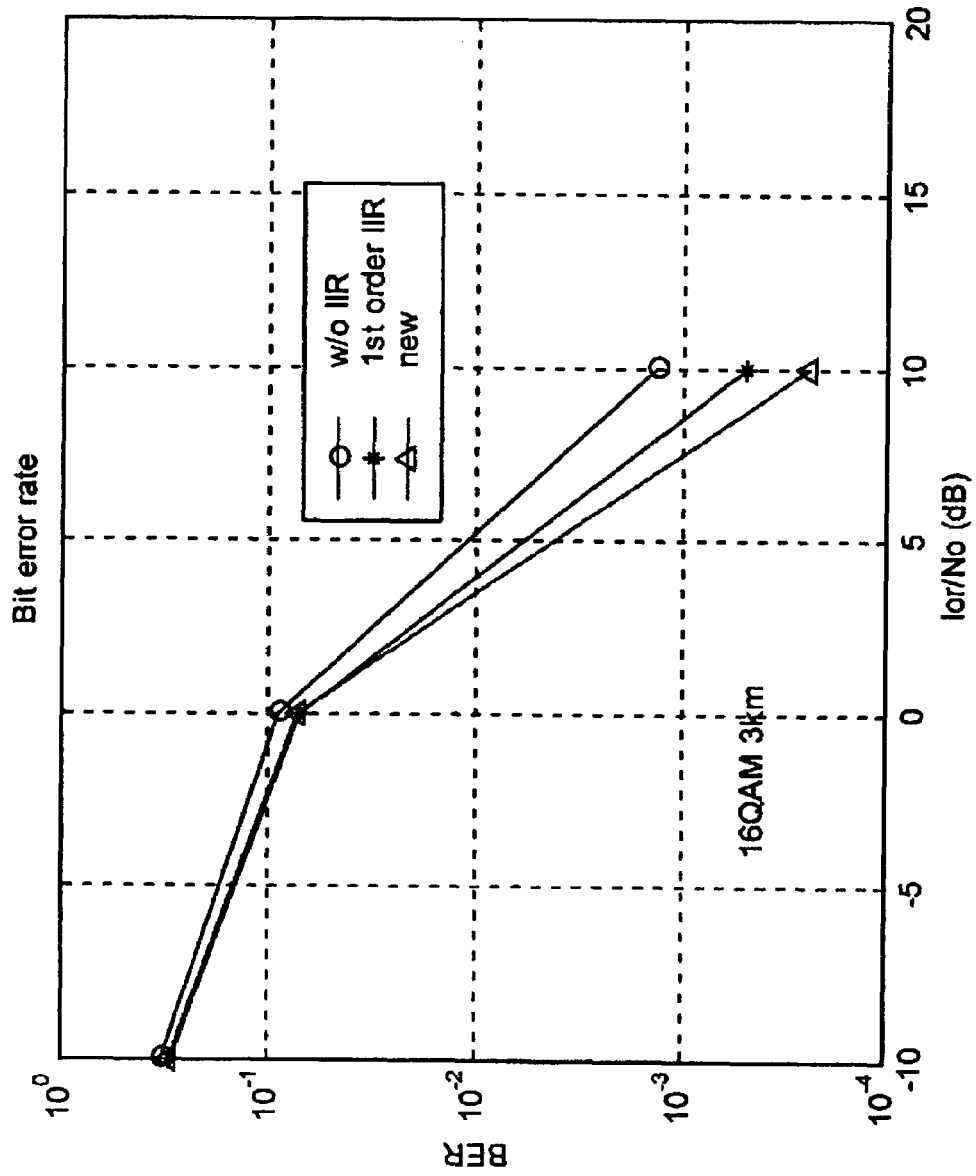
FIGS. 14 and 15 are graphs illustrating examples of a difference between a conventional channel estimator's performance and an inventive channel estimator's performance in a predetermined wireless channel environment in accordance with embodiments of the present invention.
Figure 15:
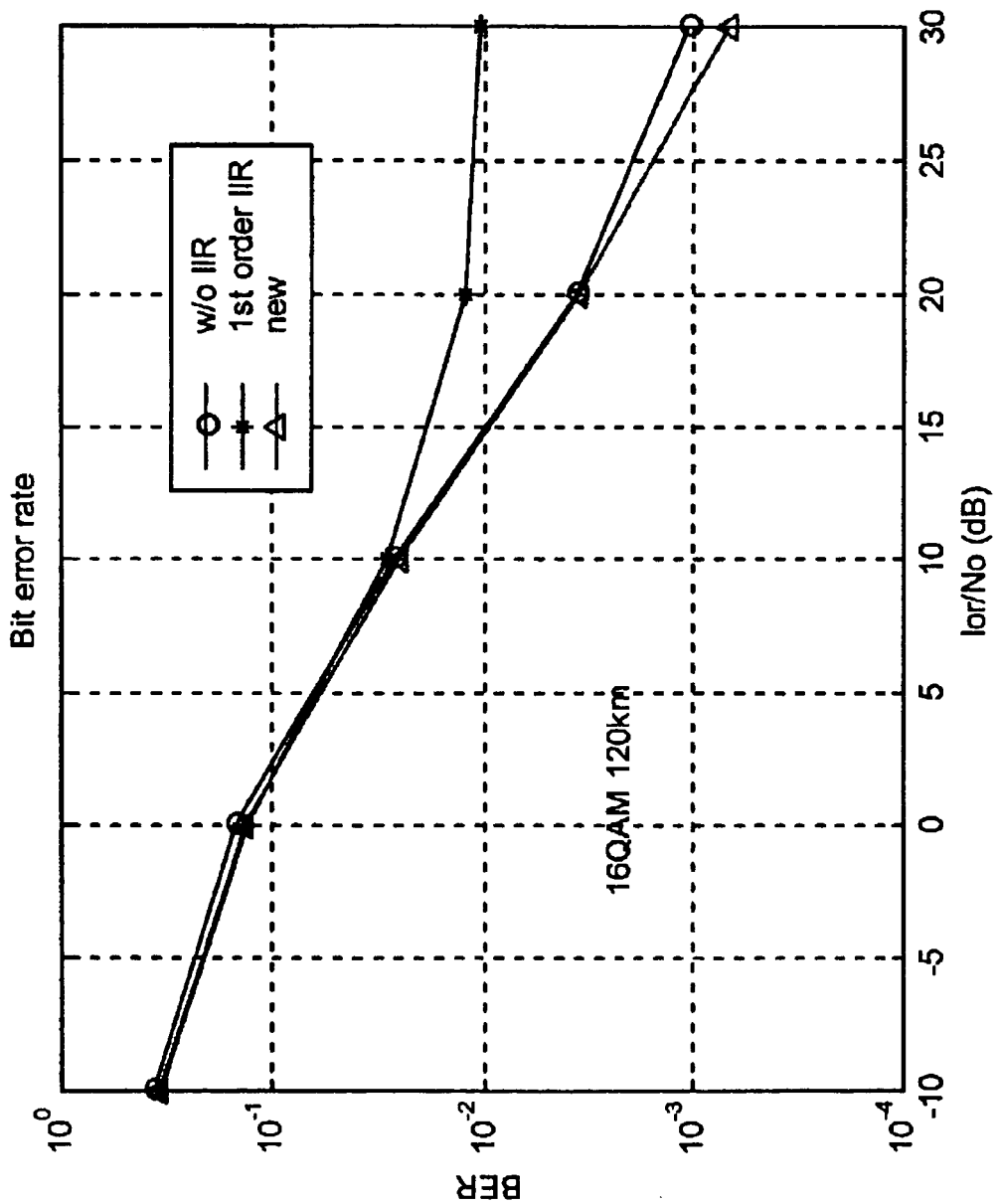

FIG. 14 is a graph illustrating an example of a difference between a conventional channel estimator's performance and an inventive channel estimator's performance in a low-speed wireless channel environment in accordance with an embodiment of the present invention. FIG. 15 is a graph illustrating an example of a difference between a conventional channel estimator's performance and an inventive channel estimator's performance in a high-speed wireless channel environment in accordance with an embodiment of the present invention. The 16QAM is adapted as a modulation method in FIG. 14, and a flat fading having no fading variance can be applied to FIG. 14. In FIG. 14, it is assumed that a channel speed of 3 km is adapted as a flat fading condition. The 16QAM is also adapted as a modulation method in FIG. 15, and it is assumed that a channel speed of 120 km is adapted as such flat fading condition in FIG. 15. On the other hand, FIGS. 14 and 15 commonly adapt a single-level reference value shown in FIG. 8. In this case, prescribed values, i.e., $T_\beta = 0.3$ and $T_\alpha = 0.2$, are adapted as such reference values, or other prescribed values. i.e., $T_{\alpha s} = 0$ and $T_{\beta s} = T_\beta$, are adapted as such reference values.

As shown in FIG. 14, the channel estimator according to embodiments of the present invention is superior to the conventional channel estimator in a low-speed channel. Further, a channel estimator having an adaptive noise elimination filter described in the embodiments of the present invention has a gain higher than that of the conventional channel estimator.

FIG. 15 shows the lagging phenomenon created in either the case of adapting a noise elimination filter in a high-speed channel, or the case of not using the noise elimination filter in the high-speed channel. Although in an embodiment of the present invention, it is preferable for the noise elimination filter not to be used for the high-speed channel, it is impossible for the noise elimination filter to be used for only a specific wireless channel environment. Therefore, a noise elimination filter is controlled according to information of a wireless channel environment, such that an additional gain can be obtained in not only a low-speed channel but also a high-speed channel.

As apparent from the above description, according to embodiments of the present invention, an inventive channel estimator having been effectively used for only a low-order modulation scheme and a low code rate can be used in a high-order modulation scheme and a high code rate, resulting in a high-speed packet transmission. Each filter coefficient of a noise elimination filter is adjusted to be suitable for individual wireless channel characteristics, and is thus available for a variety of wireless channel environments, resulting in increasing the efficiency of the channel estimator.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for determining first and second filter coefficients in a noise elimination filter which receives a predicted channel response signal and the first and second filter coefficients where their sum is set to a predetermined value, and removes a noise component from the predicted channel response signal, comprising the steps of:
   a) detecting a noise level upon receiving a difference between the predicted channel response signal and a previously predicted channel response signal, and detecting channel speed prediction information upon receiving an auto-correlation function of the predicted channel response signal; and
   b) determining first and second filter coefficients mapping-processed by the detected noise level and the detected channel speed prediction information,
   wherein the higher the first filter coefficient, the lower the second filter coefficient, whereas the lower the first filter coefficient, the higher the second filter coefficient.

2. The method as set forth in claim 1, further comprising the step of:
   c) if the detected channel speed prediction information value is lower than a predetermined threshold value, performing a slope compensation of a channel response signal of which the noise component is eliminated by the first and second filter coefficients.

3. The method as set forth in claim 1, wherein the noise level α is calculated by the following equation:

$$\alpha = \frac{1}{M_{pilot}} \sum_{n=1}^{M_{pilot}} |\tilde{c}(n) - \tilde{c}(n-1)|$$

where $M_{pilot}$ is the number of pilot symbols for every packet, $\tilde{c}(n)$ is the predicted channel response signal, and $\tilde{c}(n-1)$ is the previously predicted channel response signal.

4. The method as set forth in claim 1, wherein the channel speed prediction information is obtained by the following equations:

$$\beta = \min[R_{\tilde{c}}(l)/\max(R_{\tilde{c}})]$$

where β satisfies a predetermined condition of $0 \leq \beta \leq 1$, and min[x] is a minimum value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal $\tilde{c}(n)$.

5. The method as set forth in claim 1, wherein the channel speed prediction information is obtained by the following equations:

$$\beta = \mathrm{mean}[R_{\tilde{c}}(l)/\max(R_{\tilde{c}})]$$

where β satisfies a predetermined condition of $0 \leq \beta \leq 1$, and mean[x] is a mean value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal $\tilde{c}(n)$.

6. The method as set forth in claim 2, wherein the step (c) for performing the slope compensation includes the steps of:
   c1) respectively assigning different channel compensation values Λ(n) calculated by the following first equation to a plurality of data symbols corresponding to one pilot symbol; and c2) adapting the assigned channel compensation values Λ(n) to the following second equation, and performing slope compensation operations for every data symbol, wherein said first equation is represented by:

$$\Lambda(n) = \frac{1}{W \circ (SF_{pilot}/SF_{data})} \sum_{w=0}^{w-1} |\hat{c}(n-w) - \hat{c}(n-w-1)|$$

where n is an index of a pilot symbol contained in one packet, w is a size of window used for slope prediction, ĉ(n) is a signal of which an N-th noise is eliminated, $SF_{pilot}$ is a spreading factor (SF) of a pilot channel, $SF_{data}$ is a spreading factor (SF) of a data channel, and $SF_{pilot}/SF_{data}$ is the number of data symbols corresponding to one pilot symbol, wherein said second equation is represented by:

$c_{est}(n,k) = \hat{c}(n) \cdot k \cdot \Lambda(n)$  $(1 \leq k \leq SF_{pilot}/SF_{date})$ where $c_{est}(n,k)$ is a channel-compensated output signal of k-th data symbol with respect to an N-th pilot symbol.

7. The method as set forth in claim 1, wherein the second filter coefficient is equally distributed to N coefficients when the noise elimination filter is an N-th noise elimination filter.

8. The method as set forth in claim 1, wherein the second filter coefficient is unequally distributed to N coefficients due to different weights, when the noise elimination filter is an N-th noise elimination filter.

9. The method as set forth in claim 1, wherein the first and second filter coefficients are determined to be two filter coefficients of one group selected from among a plurality of filter coefficient groups, each group being composed of two filter coefficients, mapping-processed for every area differently assigned according to at least one first reference value for discriminating between noise levels and at least one second reference value for discriminating between channel speed prediction information, said selected one group being selectively determined according to the detected noise level and the detected channel speed prediction information.

10. An apparatus for determining first and second filter coefficients in a noise elimination filter which receives a predicted channel response signal and the first and second filter coefficients where their sum is set to a predetermined value, and removes a noise component from the predicted channel response signal, comprising:

a channel-speed/noise-level detector for detecting a noise level upon receiving a difference between the predicted channel response signal and a previously predicted channel response signal, and detecting channel speed prediction information upon receiving an auto-correlation function of the predicted channel response signal; and a filter coefficient controller for determining first and second filter coefficients mapping-processed by the detected noise level and the detected channel speed prediction information;

wherein the higher the first filter coefficient, the lower the second filter coefficient, whereas the lower the first filter coefficient, the higher the second filter coefficient.

11. The apparatus as set forth in claim 10, wherein the filter coefficient controller, if the detected channel speed prediction information value is lower than a predetermined threshold value, controls a slope compensator to perform a slope compensation of a channel response signal of which a noise component is eliminated by the first and second filter coefficients.

12. The apparatus as set forth in claim 10, wherein the noise level α is calculated by the following equation:

$$\alpha = \frac{1}{M_{pilot}} \sum_{n=1}^{M_{pilot}} |\tilde{c}(n) - \tilde{c}(n-1)|$$

where $M_{pilot}$ is the number of pilot symbols for every packet, č(n) is the predicted channel response signal, and č(n−1) is the previously predicted channel response signal.

13. The apparatus as set forth in claim 10, wherein the channel speed prediction information is obtained by the following equations:

$$\beta = \min[R_{\tilde{c}}(l)/\max(R_{\tilde{c}})]$$

where β satisfies a predetermined condition of $0 \leq \beta \leq 1$, and min[x] is a minimum value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal č(n).

14. The apparatus as set forth in claim 10, wherein the channel speed prediction information is obtained by the following equations:

$$\beta = \mathrm{mean}[R_{\tilde{c}}(l)/\max(R_{\tilde{c}})]$$

where β satisfies a predetermined condition of $0 \leq \beta \leq 1$, and mean[x] is a mean value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal č(n).

15. The apparatus as set forth in claim 11, wherein the slope compensator respectively assigns different channel compensation values Λ(n) calculated by the following first equation to a plurality of data symbols corresponding to one pilot symbol, and adapts the assigned channel compensation values Λ(n) to the following second equation, and performing slope compensation operations for every data symbol,
wherein said first equation is represented by:

$$\Lambda(n) = \frac{1}{W \circ (SF_{pilot}/SF_{data})} \sum_{w=0}^{w-1} |\hat{c}(n-w) - \hat{c}(n-w-1)|$$

where n is an index of a pilot symbol contained in one packet, w is a size of window used for slope prediction, ĉ(n) is a signal of which an N-th noise is eliminated, $SF_{pilot}$ is a spreading factor (SF) of a pilot channel, $SF_{data}$ is a spreading factor (SF) of a data channel, and $SF_{pilot}/SF_{data}$ is the number of data symbols corresponding to one pilot symbol,
wherein said second equation is represented by:

$$C_{est}(n,k) = \hat{c}(n) \cdot k \cdot \Lambda(n) \quad (1 \leq k \leq SF_{pilot}/SF_{date})$$

where $c_{est}(n,k)$ is a channel-compensated output signal of k-th data symbol with respect to an N-th pilot symbol.

16. The apparatus as set forth in claim 10, wherein the filter coefficient controller equally distributes the second filter coefficient to N coefficients when the noise elimination filter is an N-th noise elimination filter.

17. The apparatus as set forth in claim 10, wherein the filter coefficient controller unequally distributes the second filter coefficient to N coefficients due to different weights, when the noise elimination filter is an N-th noise elimination filter.

18. The apparatus as set forth in claim 10, wherein the filter coefficient controller determines first and second filter coefficients to be two filter coefficients of one group among a plurality of filter coefficient groups, each group being composed of two filter coefficients, mapping-processed for every area differently assigned according to at least one first reference value for discriminating between noise levels and at least one second reference value for discriminating between channel speed prediction information, said selected one group being selectively determined according to the detected noise level and the detected channel speed prediction information.

19. A method for receiving a common pilot channel signal at an adaptive channel estimator of a mobile communication system, and removing a noise from the received common pilot channel signal, comprising the steps of:
a) multiplying a complex conjugate of a corresponding pilot symbol by the common pilot channel signal, and outputting a predicted fading channel response signal;
b) detecting a noise level contained in the predicted fading channel response signal;
c) detecting a channel speed of the common pilot channel signal on the basis of the predicted fading channel response;
d) comparing the detected noise level with at least one first reference value;
e) comparing the detected channel speed with at least one second reference value;
f) determining first and second filter coefficients which are mapped to an area corresponding to the comparing result among first and second filter coefficients being mapping-processed for every area assigned by the first and second reference values to be filter coefficients for noise elimination; and
g) removing a noise component from the predicted fading channel response signal using the determined first filter coefficient and the determined second coefficient;

wherein the higher the first filter coefficient, the lower the second filter coefficient, whereas the lower the first filter coefficient, the higher the second filter coefficient.

20. The method as set forth in claim 19, further comprising the step of:
h) if the detected channel speed prediction information value is lower than a predetermined threshold value, performing a slope compensation of a channel response signal of which a noise component is eliminated by the first and second filter coefficients.

21. The method as set forth in claim 19, wherein the noise level α is calculated by the following equation:

$$\alpha = \frac{1}{M_{pilot}} \sum_{n=1}^{M_{pilot}} |\tilde{c}(n) - \tilde{c}(n-1)|$$

where $M_{pilot}$ is the number of pilot symbols for every packet, č(n) is the predicted channel response signal, and č(n−1) is the previously predicted channel response signal.

22. The method as set forth in claim 19, wherein the channel speed prediction information is obtained by the following equations:

$$\beta = \min[R_{\tilde{c}}(l)/\max(R_{\tilde{c}})]$$

where β satisfies a predetermined condition of $0 \leq \beta \leq 1$, and min[x] is a minimum value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal č(n).

23. The method as set forth in claim 19, wherein the channel speed prediction information is obtained by the following equations:

$$\beta = \mathrm{mean}[R_{\tilde{c}}(l)/\max(R_{\tilde{c}})]$$

where β satisfies a predetermined condition of $0 \leq \beta \leq 1$, and mean[x] is a mean value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal č(n).

24. The method as set forth in claim 20, wherein the step (h) for performing the slope compensation includes the steps of:
   h1) respectively assigning different channel compensation values Λ(n) calculated by the following first equation to a plurality of data symbols corresponding to one pilot symbol; and
   h2) adapting the assigned channel compensation values Λ(n) to the following second equation, and performing slope compensation operations for every data symbol,
wherein said first equation is represented by:

$$\Lambda(n) = \frac{1}{W \circ (SF_{pilot}/SF_{data})} \sum_{w=0}^{w-1} |\hat{c}(n-w) - \hat{c}(n-w-1)|$$

where n is an index of a pilot symbol contained in one packet, w is a size of window used for slope prediction, ĉ(n) is a signal of which an N-th noise is eliminated, $SF_{pilot}$ is a spreading factor (SF) of a pilot channel, $SF_{data}$ is a spreading factor (SF) of a data channel, and $SF_{pilot}/SF_{data}$ is the number of data symbols corresponding to one pilot symbol,
wherein said second equation is represented by:

$$c_{est}(n,k) = \hat{c}(n) \cdot k \cdot \Lambda(n) \quad (1 \leq k \leq SF_{pilot}/SF_{data})$$

where $c_{est}(n,k)$ is a channel-compensated output signal of k-th data symbol with respect to an N-th pilot symbol.

25. The method as set forth in claim 19, wherein the second filter coefficient is equally distributed to N coefficients when the noise elimination filter is an N-th noise elimination filter.

26. The method as set forth in claim 19, wherein the second filter coefficient is unequally distributed to N coefficients due to different weights, when the noise elimination filter is an N-th noise elimination filter.

27. An apparatus for receiving a common pilot channel signal at an adaptive channel estimator of a mobile communication system, and removing a noise from the received common pilot channel signal, comprising:
   a multiplier and an integration/dump filter for multiplying a complex conjugate of a corresponding pilot symbol by the common pilot channel signal, and outputting a predicted fading channel response signal;
   a channel-speed/noise-level detector for detecting a noise level contained in the predicted fading channel response signal, and detecting a channel speed of the common pilot channel signal;
   a filter coefficient controller for setting first and second filter coefficients mapped with an area corresponding to the comparing result among first and second filter coefficients being mapping-processed for every area assigned by the first and second reference values to noise elimination filter coefficients; and
   a noise elimination filter for removing a noise component from the predicted fading channel response signal using the determined first filter coefficient and the determined second coefficient;

wherein the higher the first filter coefficient, the lower the second filter coefficient, whereas the lower the first filter coefficient, the higher the second filter coefficient.

28. The apparatus as set forth in claim 27, wherein the filter coefficient controller, if the detected channel speed prediction information value is lower than a predetermined threshold value, controls a slope compensator to perform a slope compensation of a channel response signal of which a noise component is eliminated by the first and second filter coefficients.

29. The apparatus as set forth in claim 27, wherein the noise level α is calculated by the following equation:

$$\alpha = \frac{1}{M_{pilot}} \sum_{n=1}^{M_{pilot}} |\tilde{c}(n) - \tilde{c}(n-1)|$$

where $M_{pilot}$ is the number of pilot symbols for every packet, č(n) is the predicted channel response signal, and č(n−1) is the previously predicted channel response signal.

30. The apparatus as set forth in claim 27, wherein the channel speed prediction information is obtained by the following equations:

$$\beta = \min[R_{\tilde{c}}(l)/\max(R_{\tilde{c}})]$$

where β satisfies a predetermined condition of 0≦β≦1, and min[x] is a minimum value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal č(n).

31. The apparatus as set forth in claim 27, wherein the channel speed prediction information is obtained by the following equations:

$$\beta = \text{mean}[R_{\tilde{c}}(l)/\max(R_{\tilde{c}})]$$

where β satisfies a predetermined condition of 0≦β≦1, and mean[x] is a mean value of 'x'; and $$R_{\tilde{c}(n)}(l) = \sum_{n=1}^{M_{pilot}} |\tilde{c}(n)| \circ |\tilde{c}(n+l)|$$

where $$R_{\tilde{c}(n)}(l)$$

is an auto-correlation function using the predicted channel response signal c̃(n).

32. The apparatus as set forth in claim 28, wherein the slope compensator respectively assigns different channel compensation values Λ(n) calculated by the following first equation to a plurality of data symbols corresponding to one pilot symbol, and adapts the assigned channel compensation values Λ(n) to the following second equation, and performing slope compensation operations for every data symbol, wherein said first equation is represented by:

$$\Lambda(n) = \frac{1}{W \circ (SF_{pilot}/SF_{data})} \sum_{w=0}^{w-1} |\hat{c}(n-w) - \hat{c}(n-w-1)|$$

where n is an index of a pilot symbol contained in one packet, w is a size of window used for slope prediction, ĉ(n) is a signal of which an N-th noise is eliminated, $SF_{pilot}$ is a spreading factor (SF) of a pilot channel, $SF_{data}$ is a spreading factor (SF) of a data channel, and $SF_{pilot}/SF_{data}$ is the number of data symbols corresponding to one pilot symbol, wherein said second equation is represented by:

$$c_{est}(n,k) = \hat{c}(n) \cdot k \cdot \Lambda(n) \quad (1 \leq k \leq SF_{pilot}/SF_{date})$$

where $c_{est}(n,k)$ is a channel-compensated output signal of k-th data symbol with respect to an N-th pilot symbol.

33. The apparatus as set forth in claim 27, wherein the filter coefficient controller equally distributes the second filter coefficient to N coefficients when the noise elimination filter is an N-th noise elimination filter.

34. The apparatus as set forth in claim 27, wherein the filter coefficient controller unequally distributes the second filter coefficient to N coefficients due to different weights, when the noise elimination filter is an N-th noise elimination filter.

35. The apparatus as set forth in claim 27, wherein the filter coefficient controller determines first and second filter coefficients to be two filter coefficients of one group among a plurality of filter coefficient groups, each group being composed of two filter coefficients, mapping-processed for every area differently assigned according to at least one first reference value for discriminating between noise levels and at least one second reference value for discriminating between channel speed prediction information, said selected one group being selectively determined according to the detected noise level and the detected channel speed prediction information.

* * * * *